United States Patent
Moon et al.

(10) Patent No.: US 10,313,976 B2
(45) Date of Patent: Jun. 4, 2019

(54) OFDMA SOUNDING FOR WLAN SYSTEM

(71) Applicant: NEWRACOM, INC., Irvine, CA (US)

(72) Inventors: Sungho Moon, Irvine, CA (US); Young Hoon Kwon, Laguna Niguel, CA (US); Daewon Lee, Irvine, CA (US); Yujin Noh, Irvine (CA)

(73) Assignee: NEWRACOM, INC., Lake Forest, CA (US)

( * ) Notice: Subject to any disclaimer, the term of this patent is extended or adjusted under 35 U.S.C. 154(b) by 0 days.

(21) Appl. No.: 15/090,535

(22) Filed: Apr. 4, 2016

(65) Prior Publication Data

US 2016/0295513 A1 Oct. 6, 2016

Related U.S. Application Data

(60) Provisional application No. 62/142,712, filed on Apr. 3, 2015.

(51) Int. Cl.
*H04B 7/06* (2006.01)
*H04L 5/00* (2006.01)
(Continued)

(52) U.S. Cl.
CPC ...... *H04W 52/0238* (2013.01); *H04B 7/0626* (2013.01); *H04B 7/0632* (2013.01);
(Continued)

(58) Field of Classification Search
CPC .................................................. H04W 52/0238
(Continued)

(56) References Cited

U.S. PATENT DOCUMENTS 8,576,804 B2 * 11/2013 Kim ..................... H04B 7/0617
370/249
9,332,449 B2 * 5/2016 Park ..................... H04W 24/08
(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.
(Continued)

*Primary Examiner* — Peter G Solinsky
(74) *Attorney, Agent, or Firm* — Morgan, Lewis & Bockius LLP

(57) ABSTRACT

In wireless communications, an access point may send a first frame and a second frame to multiple stations. In one aspect, the first frame may be a frame for initiating a sounding protocol. The first frame may include subband-related information. In response to the first and second frames, one or more stations may generate beamforming feedback information based on content of the second frame according to the subband-related information of the first frame. The beamforming feedback information may include average signal-to-noise ratios (SNRs), where an SNR may be for a space-time stream averaged over data subcarriers in a subband. The stations may send a third frame(s) that includes the beamforming feedback information to the access point. The access point may generate, and transmit to the stations, a beamforming matrix based on the third frame(s). Other methods, apparatus, and computer-readable media are also disclosed.

20 Claims, 18 Drawing Sheets

| Nc Index | Nr Index | Channel Width | Grouping | Codebook Information | Feedback Type | Remaining Feedback Segments | First Feedback Segment | Reserved | Sounding Dialog Token Number |
|---|---|---|---|---|---|---|---|---|---|

(51) Int. Cl.
*H04W 52/02* (2009.01)
*H04W 72/08* (2009.01)
*H04W 84/12* (2009.01)

(52) U.S. Cl.
CPC ......... *H04B 7/0634* (2013.01); *H04B 7/0697* (2013.01); *H04L 5/0048* (2013.01); *H04W 72/082* (2013.01); *H04L 5/0023* (2013.01); *H04W 84/12* (2013.01); *Y02D 70/142* (2018.01); *Y02D 70/22* (2018.01); *Y02D 70/444* (2018.01)

(58) Field of Classification Search
USPC ........................................................ 370/311
See application file for complete search history.

(56) References Cited

U.S. PATENT DOCUMENTS

| | | | |
|---|---|---|---|
| 2004/0082356 A1* | 4/2004 | Walton | H04B 7/022 455/522 |
| 2007/0191066 A1* | 8/2007 | Khojastepour | H04B 7/0408 455/562.1 |
| 2009/0051592 A1* | 2/2009 | Lee | H04B 7/0408 342/368 |
| 2010/0260138 A1* | 10/2010 | Liu | H04L 5/0023 370/330 |
| 2011/0159866 A1* | 6/2011 | Kim | H04B 7/0417 455/422.1 |
| 2011/0301730 A1* | 12/2011 | Kemp | G10L 19/008 700/94 |
| 2012/0033592 A1* | 2/2012 | Kim | H04B 7/0452 370/310 |
| 2012/0087304 A1* | 4/2012 | Porat | H04B 7/0417 370/328 |
| 2013/0223427 A1 | 8/2013 | Sohn et al. | |
| 2013/0294487 A1* | 11/2013 | Kim | H04L 1/0009 375/219 |
| 2014/0050211 A1* | 2/2014 | Kim | H04B 7/0617 370/338 |
| 2014/0301240 A1 | 10/2014 | Park et al. | |
| 2015/0009951 A1 | 1/2015 | Josiam et al. | |
| 2016/0033617 A1* | 2/2016 | Hahn | G01S 5/0215 370/252 |
| 2016/0142187 A1* | 5/2016 | Yang | H04L 27/2602 370/328 |
| 2016/0241315 A1* | 8/2016 | Kwon | H04B 7/0452 |
| 2016/0278081 A1* | 9/2016 | Chun | H04W 74/08 |
| 2017/0033898 A1* | 2/2017 | Chun | H04W 74/08 |
| 2017/0339692 A1* | 11/2017 | Chun | H04L 1/0003 |

OTHER PUBLICATIONS

LAN/MAN Standards Committee of the IEEE Computer Society, "IEEE Standard for Information technology—Telecommunications and information exchange between systems Local and metropolttan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

Azizi, et al., "OFDMA Numerology and Structure," doc: IEEE 802.11-15/0330r1, Mar. 9, 2015, retrieved from http://mentor.IEEE.org/802.11/dcn/15/11-15-0330-01-00ax-ofdma-numerology-and-structure.pptx, slides 1-38.

International Search Report and Written Opinion dated Jul. 11, 2016, which issued in International Application No. PCT/US2016/25889.

IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands Below 6 GHz, IEEE Std 802.11ac-2013, Dec. 2013 (in 7 parts).

Extended European Search Report from European Patent Application No. 16774411.9, dated Nov. 2, 2018, 19 pages.

* cited by examiner

| Frame Control | Duration | RA | TA | Sounding Dialog Token | STA Info 1 | ... | STA Info n | FCS |

FIG. 6

| Category | Action | MIMO Control | Beamforming Report | MU Exclusive Beamforming Report |

FIG. 7A

| Nc Index | Nr Index | Channel Width | Grouping | Codebook Information | Feedback Type | Remaining Feedback Segments | First Feedback Segment | Reserved | Sounding Dialog Token Number |

FIG. 7B

OFDMA SOUNDING FOR WLAN SYSTEM

CROSS-REFERENCE TO RELATED APPLICATIONS

This application claims the benefit of priority from U.S. Provisional Application No. 62/142,712, entitled "OFDMA SOUNDING FOR HE WLAN," filed Apr. 3, 2015, which is incorporated herein by reference in its entirety.

TECHNICAL FIELD

The present description relates in general to wireless communication systems and methods, and more particularly to, for example, without limitation, orthogonal frequency division multiple access (OFDMA) sounding for wireless local area network (WLAN) system.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIG. 6 illustrates an example of a non-data packet announcement frame.

FIG. 7A illustrates an example of a beamforming feedback frame.

FIG. 7B illustrates an example of the MIMO Control field shown in FIG. 7A.

Figure 1:
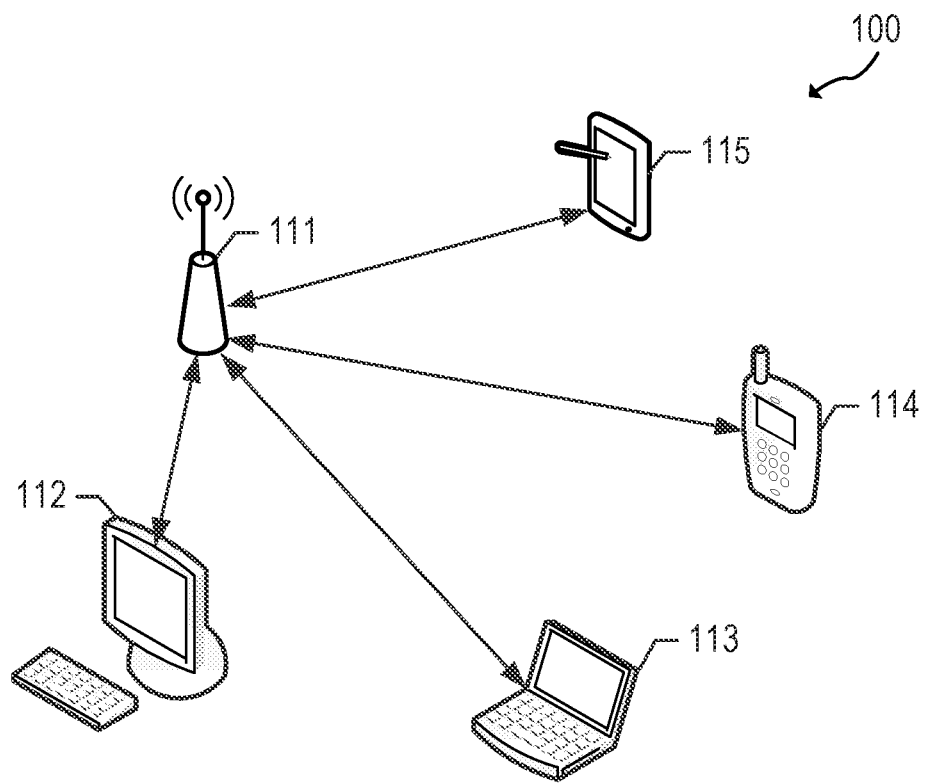
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In one or more implementations, the subject technology may support a sounding protocol between a beamformer and one or more beamformees. In one or more implementations, the subject technology may support non-data packet (NDP) sounding. The sounding protocol may allow a beamformer to request and retrieve beamforming information from one or more beamformees and compute a beamforming matrix based on beamforming information fed back by the beamformees to the beamformer. The beamforming information may be referred to as beamforming report information or beamforming feedback information and may include signal-to-noise ratio (SNR) and/or beamforming feedback vector/matrix information. The beamformer may utilize the beamforming information to generate a beamforming matrix and generate beamformed data packets (using the beamforming matrix) to be transmitted to the beamformees. The beamformees may receive the beamformed data packets. In some aspects, beamformees may compress their respective feedback matrices to reduce overhead associated with the sounding protocol. Such feedback matrices may be referred to as compressed feedback matrices.

In some aspects, the beamformer may be referred to as an initiator of the sounding protocol, and each of the beamformees may be referred to as a responder of the sounding protocol. In some aspects, the beamformer may be an access point, and the receivers may be stations (e.g., non-AP stations).

In one or more aspects, uplink (UL) multi-user (MU) operation may allow the beamformer to solicit (e.g., using a trigger frame) immediate simultaneous response frames from the beamformees. In such aspects, the beamformees may transmit their response frames using UL MU transmission technology such as UL MU orthogonal frequency division multiple access (OFDMA) and/or UL MU multi-input multi-output (MIMO).

A trigger frame may be a frame sent by an AP that seeks data, control, or management frame response(s) from stations that participate in a subsequent UL MU frame. The trigger frame may be utilized to initiate the simultaneous MU transmission in OFDMA. In an aspect, a trigger frame may include, for example, some or all of the following features: (a) a list of stations (STAs) that an access point (AP) seeks a response from; (b) resource allocation information for each STA (e.g., a subband assigned to each STA); and/or (c) attributes of the expected UL MU frame, such as the duration, bandwidth, etc., among other features. In other words, the trigger frame may be used to allocate resource for UL MU transmission and to solicit an UL MU transmission from the participating stations in response to the trigger frame. The term "resource" may refer to, for example, a bandwidth, time/duration that the STAs expect to occupy a transmission medium, and/or possibly a number of spatial streams that the STAs may use.

The beamforming feedback vector/matrix computed by each beamformee may be referred to as a beamforming feedback matrix or a feedback matrix for simplicity. The feedback matrix may be represented as a V matrix. The beamforming vector/matrix computed by the beamformer may be referred to as a beamforming matrix for simplicity. The beamforming matrix may also be referred to as a steering matrix or pre-coding matrix and may be represented as a Q matrix. In one aspect, the beamforming matrix and feedback matrix may change from tone to tone. A tone may be referred to as subcarrier. Each tone may be associated with or otherwise identified by a tone index or a subcarrier index. A tone index may be referred to as a subcarrier index.

A sounding protocol may be referred to as a sounding procedure, sounding feedback sequence, sounding protocol sequence, channel sounding protocol, channel measurement protocol, channel calibration protocol, channel state information (CSI) sounding protocol, beamforming protocol, channel calibration protocol, or variants thereof (e.g., CSI feedback sequence).

In one or more implementations, a sounding protocol may be utilized in orthogonal frequency division multiple access (OFDMA) communication. In OFDMA, feedback information (e.g., average SNR values) in the unit of subband may be helpful. The unit of subband may be a portion of a channel bandwidth. In an aspect, the unit of subband may include, without limitation, 26 tones, 52 tones, 106 tones, 242 tones, and 484 tones. In an aspect, a respective average SNR value computed over each subband may be utilized for OFDMA allocation. For example, the beamformer may utilize the feedback information from the beamformees to determine portions of the channel bandwidth to be allocated to each of the beamformees.

In one or more implementations, the subject technology may provide subband-wise non-data packet announcement (NDPA or NDP-A) schemes and relevant feedback methods. In some aspects, modifications and/or additions to the very high throughput (VHT) sounding protocol utilized in the Institute of Electrical and Electronics Engineers (IEEE) 802.11ac standard may be implemented to facilitate NDP sounding in OFDMA communication. In this regard, in some aspects, modifications and/or additions may be made with respect to NDPA frames and/or feedback report frames utilized in IEEE 802.11ac. In some aspects, the subject technology facilitates informing of feedback granularity associated with beamforming information to relevant stations and sending of feedback according to the informed feedback granularity.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA, an AP device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

Figure 2:
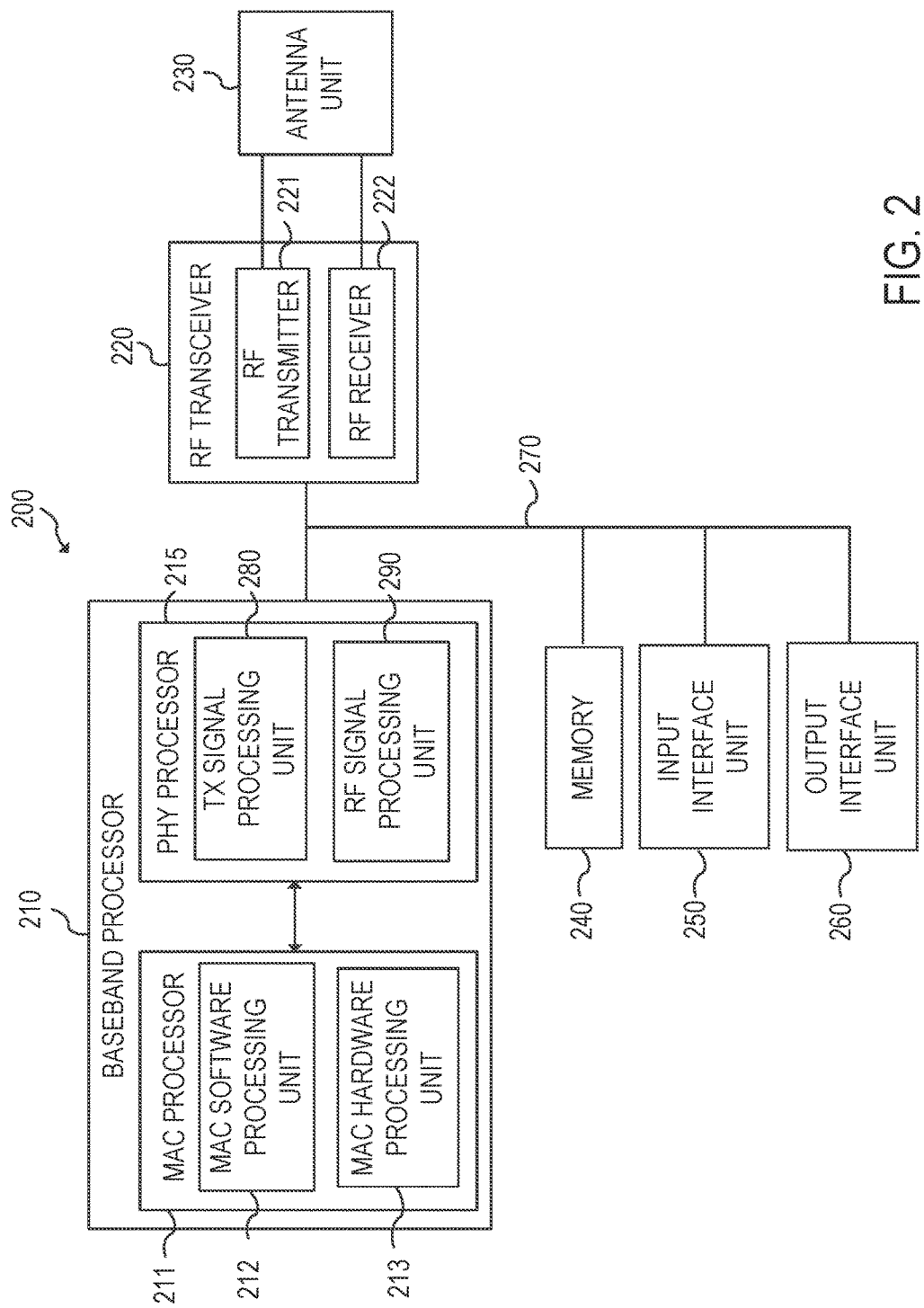
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM. PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3:
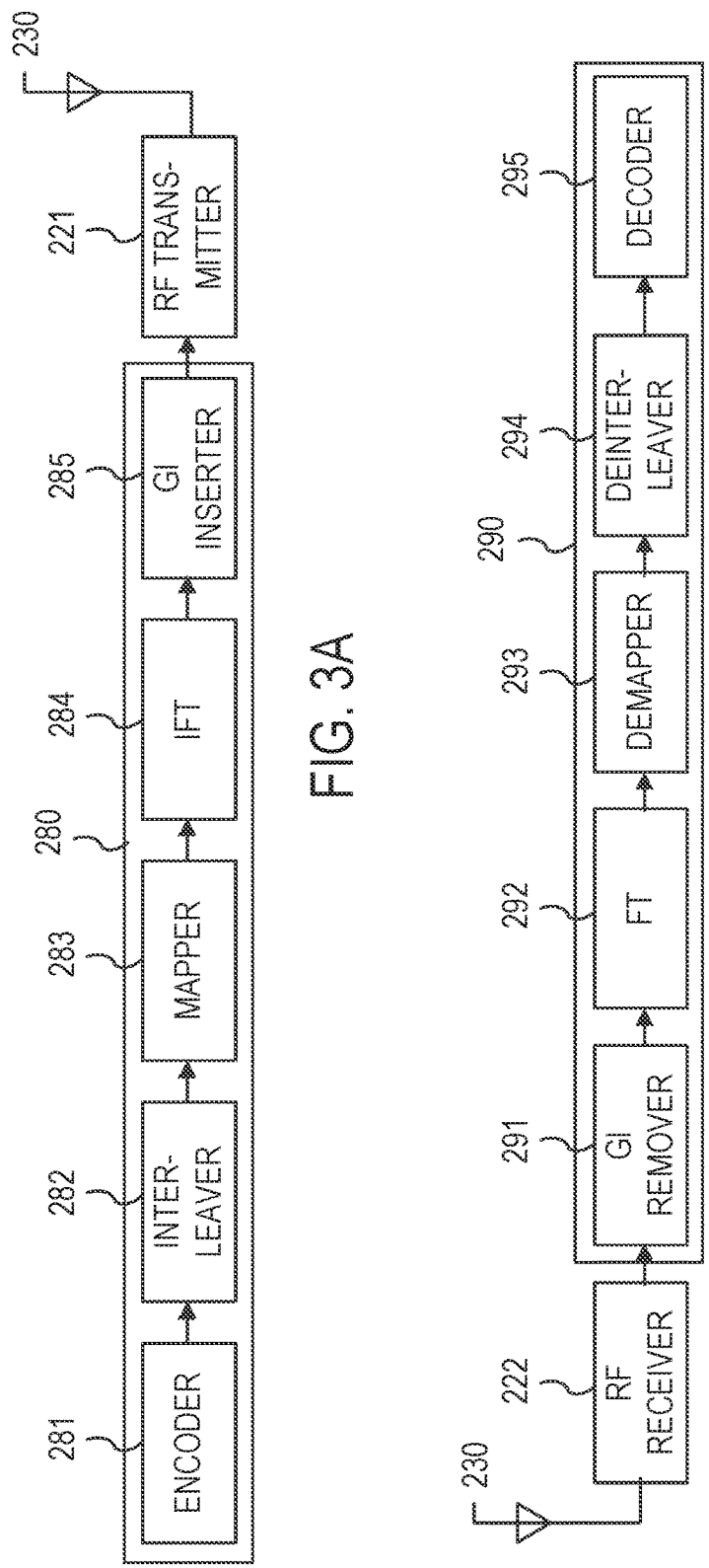
FIG. 3A illustrates a schematic block diagram of an example of a transmitting signal processor in a wireless communication device.
FIG. 3B illustrates a schematic block diagram of an example of a receiving signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
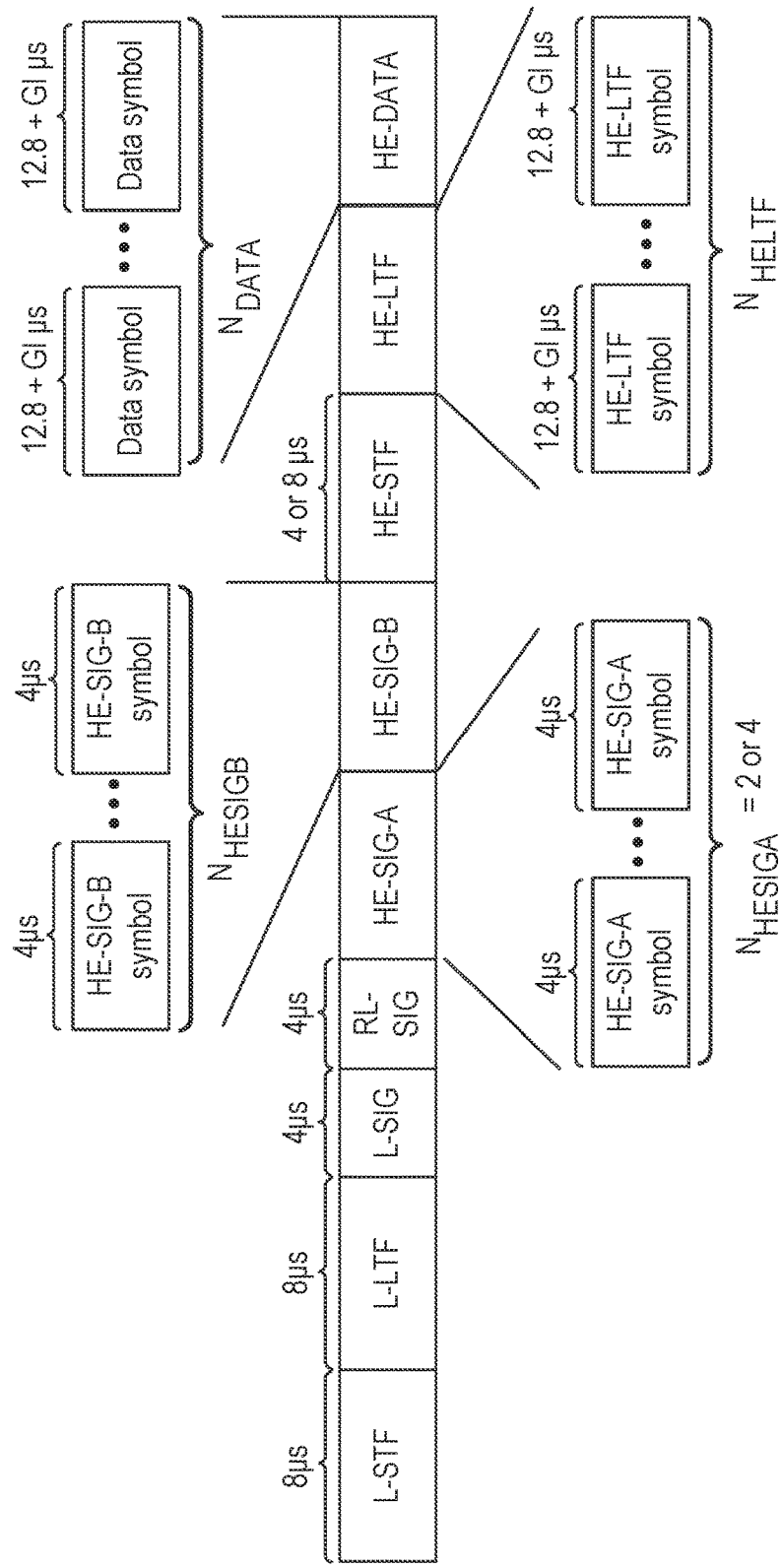
FIG. 4 illustrates an example of a high efficiency (HE) frame.

FIG. 4 illustrates an example of a high efficiency (HE) frame 400. The HE frame 400 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header).

Referring to FIG. 4, the HE frame 400 contains a header and a data field. The header includes a legacy header comprised of a legacy short training field (L-STF), a legacy long training field (L-LTF), and a legacy signal (L-SIG) field. These legacy fields contain symbols based on an early design of an IEEE 802.11 specification. The L-STF, L-LTF, and L-SIG fields may be 8 µs, 8 µs, and 4 µs, respectively. Presence of these symbols would make any new design compatible with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz (e.g., 40 MHz, 80 MHz, 160 MHz). Therefore, the legacy field (i.e., the STF, LTF, and SIG fields) occupies the entire channel bandwidth of the frame. The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. Thus, in one aspect, the L-STF field is not affected by the channel dispersion. The L-LTF field may be utilized for channel estimation, fine frequency-offset correction, and symbol timing. The L-SIG field includes one orthogonal frequency division multiplexing (OFDM) symbol. Thus, in one aspect, the term L-SIG field may be used interchangeably with L-SIG symbol. In one or more aspects, the L-SIG field may contain information indicative of a data rate and a length (e.g., in bytes) associated with the HE frame 400, which may be utilized by a receiver of the HE frame 400 to calculate a time duration of a transmission of the HE frame 400.

The header may also include an HE header comprised of an HE-SIG-A field and an HE-SIG-B field. The HE-SIG-A field may sometimes be referred to simply as a SIG-A field. These fields contain symbols that carry control information that may be vital regarding each PLCP service data unit (PSDU) and regarding the radio frequency (RF), PHY, and MAC properties of a PPDU. Several sub-fields may be located either in the HE-SIG-A and/or HE-SIG-B fields. In one aspect, the HE-SIG-A field can be carried/modulated using an FFT size of 64 on a 20 MHz basis. The HE-SIG-B field can be carried/modulated using an FFT size of e.g., 64 or 256 on a 20 MHz basis depending on implementation. The HE-SIG-A and HE-SIG-B fields may occupy the entire channel bandwidth of the frame. In some aspects, the size of the HE-SIG-A field and/or the HE-SIG-B field is variable. In other words, the number of symbols contained in the HE-SIG-A field and/or HE-SIG-B field can vary from frame to frame. An HE-SIG-B field is not always present in all frames. In some cases, single user (SU) packets and UL trigger-based packets do not contain the HE-SIG-B field. To facilitate decoding of the HE frame 400 by a receiver, the size of (e.g., number of symbols contained in) the HE-SIG-B field may be indicated in the HE-SIG-A field. In some aspects, the HE header also includes a repeated L-SIG (RL-SIG) field, whose content is the same as the L-SIG field.

For a 20 MHz channel, an FFT size of 64 is associated with a discrete Fourier transform (DFT) period of 3.2 µs and a subcarrier spacing of 312.5 kHz. For a 20 MHz channel, an FFT size of 256 is associated with a DFT period of 12.8 µs and a subcarrier spacing of 78.125 kHz. The DFT period may also be referred to as an inverse DFT period (IDFT) or an IDFT/DFT period. The DFT period may be denoted as $T_{DFT}$. The subcarrier spacing may be referred to as a subcarrier frequency spacing and may be denoted as $\Delta_F$. The subcarrier spacing may be obtained by dividing the channel bandwidth by the FFT size. The subcarrier spacing is the reciprocal of the DFT period.

The HE header may further include HE-STF and HE-LTF fields, which contain symbols used to perform necessary RF and PHY processing for each PSDU and/or for the whole PPDU. The HE-LTF symbols may be modulated/carried with an FFT size of 256 for 20 MHz bandwidth and modulated over the entire bandwidth of the frame. Thus, the HE-LTF field may occupy the entire channel bandwidth of the frame. In one aspect, an HE-LTF sequence may be utilized by a receiver to estimate MIMO channel between the transmitter and the receiver. Channel estimation may be utilized to decode data transmitted and compensate for channel properties (e.g., effects, distortions). For example, when a preamble is transmitted through a wireless channel, various distortions may occur, and a training sequence in the HE-LTF field is useful to reverse the distortion. This may be referred to as equalization. To accomplish this, the amount of channel distortion is measured. This may be referred to as channel estimation. In one aspect, channel estimation is performed using an HE-LTF sequence, and the channel estimation may be applied to other fields that follow the HE-LTF sequence.

The HE-STF symbols may have a fixed pattern and a fixed duration. For example, the HE-STF symbols may have a predetermined repeating pattern. In one aspect, the HE-STF symbols do not require FFT processing. The HE frame 400 may include the data field, represented as HE-DATA, that contains data symbols. The data field may also be referred to as a payload field, data, payload or PSDU.

In one or more aspects, additional one or more HE-LTF fields may be included in the header. For example, an additional HE-LTF field may be located after a first HE-LTF field. The HE-LTF fields may be, for example, modulated/carried with FFT size of 64 on a 20 MHz channel and may be included as part of the first part of the HE frame 400. In one or more implementations, a TX signal processing unit 280 (or an IFT 284) illustrated in FIG. 3A may carry out the modulation described in this paragraph as well as the modulations described in other paragraphs above. In one or more implementations, an RX signal processing unit 290 (or an FT 292) may perform demodulation for a receiver.

In one or more implementations, the subject technology supports sounding protocols that include non-data packet (NDP) sounding and and/or explicit feedback from beamformees to a beamformer that initiates the sounding protocol. The NDP sounding may involve the exchanging between the beamformees and beamformer of non-data packet announcement (NDPA) frame(s), NDP frame(s), beamforming report poll frame(s), and beamforming report frame(s).

Figure 5A:
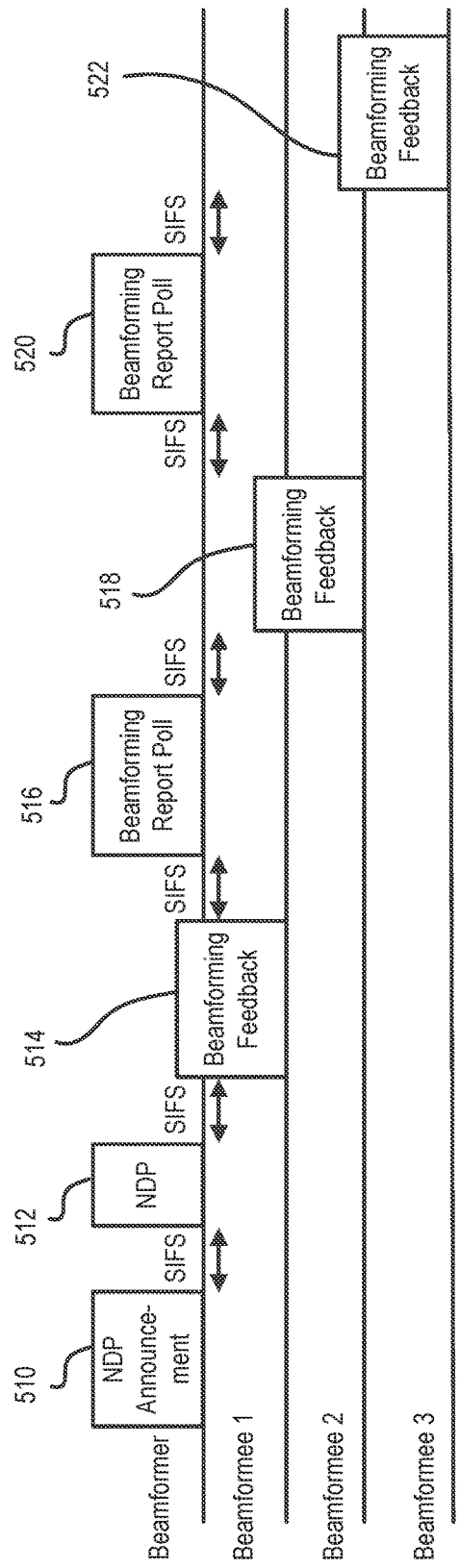
FIGS. 5A and 5B illustrate examples of sounding protocols with a beamformer and more than one beamformee.

FIG. 5A illustrates an example of a sounding protocol with a beamformer and more than one beamformee. In an aspect, the sounding protocol may be referred to as an NDP sounding protocol. Although FIG. 5A illustrates an example of a sounding protocol with multiple beamformees, the sounding protocol may involve one beamformer and one beamformee in some cases.

The beamformer may initiate the sounding protocol by sending an NDPA frame 510 followed by an NDP frame 512. The NDPA frame 510 may be utilized by the beamformer to identify the beamformees being included by the beamformer in the sounding protocol and indicate to these beamformees that the beamformer requests (e.g., expects) them to prepare (e.g., measure, generate) beamforming information to be fed back to the beamformer.

The non-data packet frame may be referred to as a null data packet frame. The non-data packet announcement frame may be referred to as a null data packet announcement frame. A sounding protocol that utilizes NDPA frames and NDP frames may be referred to as an NDP sounding protocol or NDP-based sounding protocol.

The NDPA frame 510 may include one or more fields to identify the beamformees. In some aspects, the NDPA frame 510 may include one Station Information (STA Info) field for each beamformee. The NDPA frame 510 may include a STA Info 1 field, STA Info 2 field, and STA Info 3 field that are associated with beamformees 1, 2, and 3, respectively. Each STA Info field may include an Association Identifier (AID) field that identifies a respective beamformee. An example of an NDPA frame will be described further below with respect to FIG. 6.

The NDPA frame 510 is generally immediately followed by the NDP frame 512. Upon receipt of the NDP frame 512, each of the beamformees identified in the NDPA frame 510 may generate beamforming information (e.g., average SNR value(s), feedback matrix/matrices) based on the NDP frame 512. In some aspects, the NDP frame 512 may be the HE frame 400, except without the HE-DATA field or with an empty HE-DATA field. For example, the NDP frame 512 may include only the header (e.g., the legacy and HE headers) of the HE frame 400. In some aspects, the beamformees may compute feedback matrices and/or SNR values based on the NDP frame 512. The beamforming information may be based on analysis of, for example, the training fields (e.g., L-STF, L-LTF, HE-STF, HE-LTF) contained in the NDP frame 512. For example, the beamformees may perform measurements (e.g., power measurements) on the NDP frame 512 at various tones.

In response to the NDPA frame 510, beamformee 1 may transmit a beamforming feedback frame 514. The beamforming feedback frame 514 includes beamforming information generated by beamformee 1. To retrieve the beamforming information from the remaining beamformees, the beamformer may transmit a beamforming report poll frame 516, whose intended recipient may be designated in a Receiver Address (RA) field of the beamforming report poll frame 516. The intended recipient of the beamforming report poll frame 516 is the beamformee whose beamforming information is being requested by (e.g., retrieved by) the beamformer. When the beamforming report poll frame 516 identifies beamformee 2 in its RA field, beamformee 2 may transmit a beamforming feedback frame 518 to the beamformer in response to the beamforming report poll frame 516. The beamformer may transmit a beamforming report poll frame 520 whose RA field is designated as beamformee 3. Beamformee 3 may transmit a beamforming feedback frame 522 to the beamformer in response to the beamforming report poll frame 520. The beamforming feedback frames 518 and 522 contain the beamforming information generated by beamformees 2 and 3, respectively. An example of a beamforming feedback frame will be described further below with respect to FIGS. 7A and 7B.

In some aspects, beamformees may compress their respective beamforming information (e.g., feedback matrices) to reduce overhead associated with the sounding protocol. A beamforming feedback frame that contains compressed feedback matrices may be referred to as a compressed beamforming feedback frame. The compressed feedback matrices may be referred to as compressed V matrices and their elements may be referred to as compressed-V beamforming weights. In an aspect, the compression and/or format of the beamforming information may be indicated by the beamformer in the NDPA frame. The disclosure may refer to compressed versions of the beamforming information, feedback matrices, and the beamforming feedback frames for simplicity, although non-compressed versions of the beamforming information, feedback matrices, and beamforming feedback frames may be utilized.

In an aspect, as shown in FIG. 5A, the beamformer may retrieve beamforming information in the order associated with the index of the STA Info field. For example, the beamformee associated with STA Info 1 field may transmit a beamforming report frame to the beamformer upon receipt of the NDP frame 512, while the remaining beamformees (e.g., beamformee 2 and beamformee 3) need to be polled prior to the remaining beamformees transmitting their respective beamforming report frames to the beamformer. The remaining beamformees may be polled such that the beamformee associated with the STA Info 2 field is polled and then the beamformee associated with the STA Info 3 field is polled. Other manners by which the beamformer determines an order in which beamforming information is retrieved from the beamformees may be utilized. In another aspect, the beamformer may retrieve beamforming information simultaneously from one or more beamformees associated with STA Info fields (e.g. STA Info 1, STA Info 2 and STA Info 3) using UL multi-user transmission technology such as UL MU OFDMA and UL MU-MIMO. An example of such an aspect will be described further below with respect to FIG. 5B.

Upon retrieving the beamforming information from the beamformees, the beamformer may generate a beamforming matrix to be utilized for generating beamformed data packets for beamformees 1, 2, and 3. In one aspect, the time period between any two adjacent frames 510, 512, 514, 516, 518, 520, and 522 may be a short interface space (SIFS).

Figure 5B:
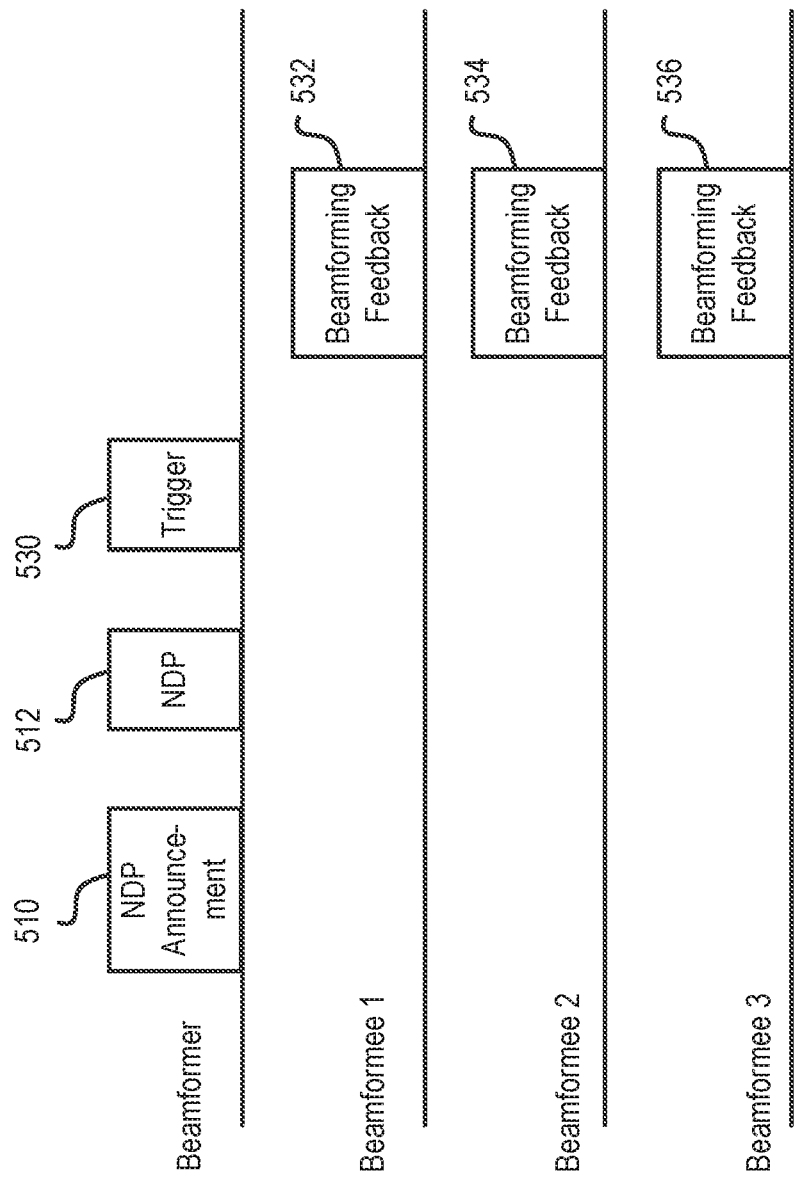

FIG. 5B illustrates another example of a sounding protocol with a beamformer and more than one beamformee. The description from FIG. 5A generally applies to FIG. 5B, with examples of differences between FIG. 5A and FIG. 5B and other description provided herein for purposes of clarity and simplicity.

The sounding protocol (e.g., HE sounding protocol) may be initiated by the beamformer sending the NDPA frame 510 followed by the NDP frame 512. In an aspect the NDP frame 512 may be transmitted a SIFS after the end of the NDPA frame 510 (e.g., after the end of the PPDU carrying the NDPA frame 510). Upon receipt of the NDP frame 512, each of the beamformees identified in the NDPA frame 510 may generate beamforming information based on the NDP frame 512.

The beamformer may use (e.g., send) a trigger frame 530 to solicit (e.g., retrieve) beamforming feedback from the beamformees. In an aspect, the trigger frame 530 may be utilized by the beamformer to retrieve beamforming information simultaneously from the beamformees 1, 2, and 3. The trigger frame 530 may indicate resource allocation information for the beamformees. The resource allocation information may include a subband (or a frequency subchannel) assigned to each respective one of the beamformees. In some aspects, the resource allocation information may also include scheduling information regarding when a respective one of the beamformees may transmit using its assigned subband, and/or may include the number of spatial streams that the beamformees may use.

In response to the trigger frame 530, beamformees 1, 2, and 3 may transmit (e.g., simultaneously transmit) a beamforming feedback frame 532, 534, and 536, respectively. The beamforming feedback frame 532, 534, and 536 may contain the beamforming information generated by beamformees 1, 2, and 3, respectively. Upon retrieving the beamforming information from the beamformees, the beamformer may generate a beamforming matrix to be utilized for generating beamformed data packets for beamformees 1, 2, and 3.

In one or more implementations, the frames 510, 512, 514, 516, 518, 520, 522, 530, 532, 534, and 536 illustrated in FIGS. 5A and 5B may represent PPDUs. In some aspects, the frames 514, 516, 518, 520, 522, 530, 532, 534, and 536 are Media Access Control (MAC) Protocol Data Units (MPDUs) (e.g., MAC frames). The MPDUs may be a payload(s) of a PPDU. The PPDU may have the format of the HE frame 400 shown in FIG. 4.

FIG. 6 illustrates an example of an NDPA frame 600. In some aspects, the NDPA frame 510 may be, may include, or may be a part of, the NDPA frame 600. In some aspects, the NDPA frame 600 may be a MAC frame that forms at least a part of the payload of the HE frame 400. The NDPA frame 600 may include a Frame Control field, Duration field, Receiver Address (RA) field, Transmitter Address (TA) field, Station Information (STA Info) 1 field, STA Info n field, and Frame Check Sequence (FCS) field. It is noted that the ellipses between the STA Info 1 field and STA Info n field indicate that one or more additional STA Info fields or no STA Info fields are present between the STA Info 1 field and STA Info n field. Each STA Info field is associated with one station. Although the NDPA frame 600 includes at least a STA Info 1 field and a STA Info n field, an NDPA frame may include a single STA Info field.

In some aspects, the TA field may be set to the address of the transmitter of the NDPA frame 600. The transmitter may be the beamformer that initiates a sounding protocol. In some aspects, when the NDPA frame 600 includes more than one STA Info field, the RA field of the NDPA frame 600 may be set to a broadcast address. In some aspects, the broadcast address may be a MAC sublayer address. The broadcast address may be a distinguished, predefined group (e.g., multidestination) address that is utilized to denote a set of all stations on a given network (e.g., LAN). As an example, with reference to FIG. 6, the TA field may include the address of the beamformer, and the RA field may include a broadcast address associated with beamformees 1, 2, and 3. In some aspects (not shown), if an NDPA frame includes a single STA Info field, the RA field of the NDPA frame may be set to an address (e.g., MAC address) of the single beamformee associated with the single STA Info field.

With reference to FIG. 6 and Table 1 below, each STA Info field may include an Association Identifier (AID) field, a Feedback Type field, and an Nc Index field. The AID field in each STA Info field may contain an AID value that identifies a beamformee. An AID field of the STA Info 1, STA Info 2, and STA Info 3 fields may be set to an AID value associated with beamformee 1, 2, and 3, respectively. In some aspects, the AID field may be referred to as the AID12 field, such as in the case that the AID field includes 12 bits (e.g., 12 least significant bits) of the AID value.

The Feedback Type field includes a value indicative of a type of feedback (e.g., SU-feedback, MU feedback) requested by the beamformer. In the MU feedback case, the Nc Index field may be used to indicate the number of columns in the compressed beamforming feedback matrix to be provided by the beamformee to the beamformer. In some aspects, in the SU feedback case, the Nc Index field is not used. The beamformees may generate beamforming information in accordance with the Feedback Type field and/or the Nc Index field of the NDPA frame 600.

Table 1 below provides an example of fields that may be contained in each of the STA Info fields of the NDPA frame 600 (e.g., STA Info 1 field, STA Info n field, etc.).

TABLE 1

Example of fields in a STA Info field

| Field | Description |
|---|---|
| AID12 | Contains the 12 least significant bits of the AID of a STA expected to process the following NDP and prepare the sounding feedback. Equal to 0 if the STA is an AP, mesh STA or STA that is a member of an independent basic service set (IBSS). |
| Feedback Type | Indicates the type of feedback requested.<br>  Set to 0 for SU.<br>  Set to 1 for MU. |
| Nc Index | If the Feedback Type field indicates MU, then Nc Index indicates the number of columns, Nc, in the Compressed Beamforming Feedback Matrix subfield minus 1:<br>  Set to 0 to request Nc = 1<br>  Set to 1 to request Nc = 2<br>  . . .<br>  Set to 7 to request Nc = 8<br>Reserved if the Feedback Type field indicates SU. |

FIG. 7A illustrates an example of a beamforming feedback frame 700. The beamforming feedback frame may also be referred to as a beamforming feedback report frame, beamforming report frame, or report frame. The beamforming feedback frame 700 may be a MAC frame. In an aspect, the beamforming feedback frame 700 may be a payload of the HE frame 400. The beamforming feedback frame 700 may be a compressed beamforming feedback frame (e.g., when beamforming information contained in the beamforming feedback frame 700 is compressed). The beamforming feedback frame 700 may be any one of beamforming feedback frames 514, 518, and 522.

The beamforming feedback frame 700 includes a Category field, Action field, MIMO Control field, Beamforming Report field, and MU Exclusive Beamforming Report field. In an aspect, the MIMO Control field may be considered a header or portion thereof of the beamforming feedback frame 700 whereas the Beamforming Report field and the MU Exclusive Beamforming Report field may be considered a payload or portion thereof of the beamforming feedback frame. The MIMO Control field may contain information indicative of the format of the Beamforming Report field and the MU Exclusive Beamforming Report field.

In a non-MU case (e.g., SU case), the beamforming feedback frame does not include the MU Exclusive Beamforming Report field. In some aspects, the Beamforming Report field may be referred to as a Compressed Beamforming Report field and used to include compressed beamforming information. The Beamforming Report field may contain SU feedback information or MU feedback information depending on the Feedback Type field of the NDPA frame (e.g., 600 in FIG. 6) from the beamformer. A portion of the Beamforming Report field may include average SNR values and another portion of the Beamforming Report field may include beamforming feedback matrices. The beamformer can calculate a beamforming matrix Q based on the SU and/or MU feedback information.

FIG. 7B illustrates an example of the MIMO Control field shown in FIG. 7A. The MIMO Control field includes an Nc Index field, Nr Index field, Channel Width field, Grouping field, Codebook Information field, Feedback Type field, Remaining Feedback Segments field, First Feedback Segment field, and Sounding Dialog Token Number field. These fields may be referred to as subfields of the MIMO Control field. The Nc Index field and the Nr Index field may indicate a number of columns and rows, respectively, in the feedback matrices (e.g., compressed feedback matrices). The Grouping field may indicate a subcarrier grouping Ng, where one compressed feedback matrix is provided every Ng subcarriers. For example, if Ng is 4, a compressed feedback matrix may be provided every fourth subcarrier. The Feedback Type field may indicate the type of feedback (e.g., SU or MU). The Feedback Type field of the MIMO Control field may have the same value as the Feedback Type field of the NDPA frame from the beamformer.

In an aspect, if the feedback type is SU, the Beamforming Report field may contain the average SNR values over all reported data subcarriers of space-time (ST) streams from 1 to Nc. An example of beamforming report information included in the Beamforming Report field is illustrated in Table 2. In this regard, Table 2 provides an example of an order in which information is provided in the Beamforming Report field. For example, in the Beamforming Report field, an "Average SNR of Space-Time Stream 1" field may be followed by an "Average SNR of Space-Time Stream 2" field. In an aspect, Table 2 illustrates VHT compressed beamforming report information.

TABLE 2

Example of Compressed Beamforming Report information

| Field | Size (bits) | Meaning |
|---|---|---|
| Average SNR of Space-Time Stream 1 | 8 | Signal-to-noise ratio at the beamformee for space-time stream 1 averaged over all data subcarriers. See Table 8-53h (Average SNR of Space-Time Stream i subfield). |
| ... | ... | ... |
| Average SNR of Space-Time Stream Nc | 8 | Signal-to-noise ratio at the beamformee for space-time stream Nc averaged over all data subcarriers. See Table 8-53h (Average SNR of Space-Time Stream i subfield). |
| Compressed Beamforming Feedback Matrix V for subcarrier k = scidx(0) | N α × $(b_\psi + b_\phi)/2$ | Compressed beamforming feedback matrix as defined in Table 8-53d (Order of angles in the Compressed Beamforming Feedback Matrix subfield) and Table 8-53e (Quantization of angles). |
| Compressed Beamforming Feedback Matrix V for subcarrier k = scidx(1) | N α × $(b_\psi + b_\phi)/2$ | Compressed beamforming feedback matrix as defined in Table 8-53d (Order of angles in the Compressed Beamforming Feedback Matrix subfield) and Table 8-53e (Quantization of angles). |
| Compressed Beamforming Feedback Matrix V for subcarrier k = scidx(2) | N α × $(b_\psi + b_\phi)/2$ | Compressed beamforming feedback matrix as defined in Table 8-53d (Order of angles in the Compressed Beamforming Feedback Matrix subfield) and Table 8-53e (Quantization of angles). |
| ... | ... | ... |
| Compressed Beamforming Feedback Matrix V for subcarrier k = scidx (Ns − 1) | N α × $(b_\psi + b_\phi)/2$ | Compressed beamforming feedback matrix as defined in Table 8-53d (Order of angles in the Compressed Beamforming Feedback Matrix subfield) and Table 8-53e (Quantization of angles). |

NOTE
scidx( ) is defined in Table 8-53g (Subcarriers for which a Compressed Beamforming Feedback Matrix subfield is sent back)

In an aspect, if the feedback type is MU, the beamforming feedback frame 700 may include additional beamforming report information on top of the information provided for SU feedback (e.g., in the Beamforming Report field). The additional beamforming report information may include delta SNR (ΔSNR) for space-time stream from 1 to Nc for each reported subcarrier. Table 3 illustrates an example of MU Exclusive Beamforming Report information. In this regard, Table 3 provides an example of an order in which information is provided in the MU Exclusive Beamforming Report field.

TABLE 3

Example of MU Exclusive Beamforming Report information

| Field | Size (Bits) | Meaning |
|---|---|---|
| Delta SNR for space-time stream 1 for subcarrier k = sscidx(0) | 4 | $\Delta SNR_{sscidx(0), 1}$ |
| ... | ... | ... |
| Delta SNR for space-time stream Nc for subcarrier k = sscidx(0) | 4 | $\Delta SNR_{sscidx(0), Nc}$ |
| Delta SNR for space-time stream 1 for subcarrier k = sscidx(1) | 4 | $\Delta SNR_{sscidx(1), 1}$ |
| ... | ... | ... |
| Delta SNR for space-time stream Nc for subcarrier k = sscidx(1) | 4 | $\Delta SNR_{sscidx(1), Nc}$ |
| ... | ... | ... |
| Delta SNR for space-time stream 1 for subcarrier k = sscidx(Ns' − 1) | 4 | $\Delta SNR_{sscidx(Ns'-1), 1}$ |
| ... | ... | ... |
| Delta SNR for space-time stream Nc for subcarrier k = sscidx(Ns' − 1) | 4 | $\Delta SNR_{sscidx(Ns'-1), Nc}$ |

NOTE
sscidx( ) is defined in Table 8-53j (Number of subcarriers and subcarrier mapping).

In an aspect, an example of the various variables in Table 3 is provided as follows:

$$\Delta SNR_{k,i} = \min\left(\max\left(\text{round}\left(10\log_{10}\left(\frac{\|H_k V_{k,i}\|^2}{N}\right) - \overline{SNR_i}\right), -8\right), 7\right)$$

where
  k is the subcarrier index in the range of sscidx(0), . . . , sscidx(Ns'−1)
  i is the space-time stream index in the range of 1, . . . . Nc;
  $H_k$ is the estimated MIMO channel for subcarrier k;
  $V_{k,i}$ is column i of the beamforming matrix V for subcarrier k;
  N is the average noise plus interference power, measured at the beamformee, that was used to calculate $\overline{SNR_i}$; and
  $\overline{SNR_i}$ is the average SNR of space-time stream i reported in the Compressed Beamforming Report information (Average SNR in Space-Time Stream i field).

It is noted that the ellipses in Tables 2 and 3 may indicate that one or more additional fields or no additional fields are present between fields adjacent to the ellipses.

In one or more implementations, the sounding protocol may be utilized in OFDMA communication. In OFDMA, information associated with overall channel condition from each station's perspective (e.g., each station's beamforming condition) may facilitate beamforming (e.g., computation of the beamforming matrix Q by the beamformer). In some aspects, feedback for one or more subbands smaller than or equal to the operating channel bandwidth (e.g., 20 MHz, 40 MHz, 80 MHz, 160 MHz) may be utilized for beamforming in OFDMA operations. In an aspect, finer granularity for the beamforming information may incur more beamforming feedback overhead than coarser granularity.

In OFDMA, in one aspect, an access point may allocate different portions of a channel bandwidth to different stations. In one aspect, a portion of a channel bandwidth is allocated to a station. In one aspect, a portion of a channel bandwidth may be a resource unit (RU). In another aspect, a portion of a channel bandwidth may be one or more resource units. In yet another aspect, a portion of a channel bandwidth may be one or more blocks of a channel bandwidth. In an aspect, the access point may be the beamformer of FIGS. 5A and 5B and the stations that are allocated different portions of the channel bandwidth may be the beamformees of FIGS. 5A and 5B. In an aspect, the access point may utilize the sounding protocol to determine portion(s) of the channel bandwidth to be allocated to each of the beamformees.

In one or more implementations, the NDPA frame (e.g., 510 in FIGS. 5A and 5B) may include subband-related information. In an aspect, the subband-related information may identify subbands of a bandwidth over which beamforming information is being requested by the beamformer from the beamformees. In an aspect, such a bandwidth may be referred to as a bandwidth to be reported by a beamforming report. In another aspect, such a bandwidth may be referred to as a bandwidth to be reported by the Beamforming Report field of a beamforming feedback frame. In another aspect, such a bandwidth may be referred to as a bandwidth to be reported by a beamforming feedback frame. In another aspect, such a bandwidth may be referred to as a bandwidth to be reported by a frame comprising a beamforming report. In another aspect, such a bandwidth may be referred to as a bandwidth to be reported by a station (e.g., beamformee 1, beamformee 2, and/or beamformee 3 in FIG. 5A or 5B) responding to an AP (e.g., a beamformer in FIG. 5A or 5B).

In an aspect, the subbands identified for a beamformee may encompass (i) less than an entirety of the bandwidth to be reported or (ii) less than the channel bandwidth (e.g., a channel bandwidth of a frame 510, 512, 514, 518, 522, 530, 532, 534, or 536 of FIG. 5A or 5B). In an aspect, a bandwidth to be reported by a beamforming report is smaller than a channel bandwidth of a frame (e.g., a channel bandwidth of a frame 510, 512, 514, 518, 522, 530, 532, 534, or 536 of FIG. 5A or 5B). In an aspect, each subband is smaller than a bandwidth to be reported. In an aspect, each subband is smaller than a channel bandwidth.

In an aspect, a minimum size of each subband is 26 tones when a beamforming feedback frame (e.g., a frame 514, 518, 522, 532, 534, or 536 in FIG. 5A or 5B) is for OFDMA transmission. In an aspect, the 26 tones correspond to 26 tones in a smallest resource unit of a numerology of OFDMA transmission associated with a channel bandwidth of a frame (e.g., a channel bandwidth of a frame 510, 512, 514, 518, 522, 530, 532, 534, or 536 of FIG. 5A or 5B). In an aspect, a beamforming report utilizes one or more subbands designated by at least one of the AP's frames (e.g., a frame 510, 512 and/or 530 of FIG. 5A or 5B), one or more subbands are one or more resource units, and each of the one or more resource units has 26 tones.

Based on the subband-related information included in the NDPA frame, each beamformee may calculate an average SNR value for each subband identified in the NDPA frame and feed back the calculated average SNR value to the beamformer (e.g., in the Beamforming Report field of a beamforming feedback frame). The Beamforming Report (e.g., Compressed Beamforming Report) information may include the average SNR value for the subbands. In an aspect, VHT compressed beamforming report information may be modified to include such average SNR values for the subbands. In an aspect, the Compressed Beamforming Report information provided in Table 2 may be modified to include such average SNR values for the subbands (e.g., rather than one average SNR value averaged over all data subcarriers for each space-time stream).

In some aspects, the NDPA frame may include the same subband information for all the stations (e.g., beamformees) identified in the sounding protocol. In some aspects, the NDPA frame may include different subband information for different stations (e.g., different beamformees). In these aspects, the beamformer may request that one station provide average SNR values for a first set of subbands and may request that another station provide average SNR values for a second set of subbands, where at least one subband in the first set is not contained in the second set of subbands.

In one or more implementations, the subband information associated with each beamformee may be contained in the Nc Index field of the STA Info field associated with the beamformee. With reference to FIG. 6 and Table 1, the Nc index may be interpreted differently depending on whether SU feedback or MU feedback is utilized. In Table 1, if the feedback type is SU, then the Nc Index field is not used in OFDM transmission. In some aspects. MU-MIMO is supported only in a downstream direction. In some aspects, OFDMA and MU may not be supported simultaneously.

In one or more implementations, if the feedback type is SU, the Nc Index field, previously unused, may be utilized to include subband-related information for the sounding protocol. The subband-related information may be utilized by the beamformer to request beamforming information for individual subband(s) identified in the Nc Index field. In an aspect, a minimum size of each subband is 26 tones. In an aspect, the beamformer may request beamforming information for individual subbands each of which includes 26 tones.

Table 4 provides an example of Compressed Beamforming Report information in which beamforming information is generated in accordance with subband-related information. A Compressed Beamforming Report information may be referred to as a beamforming report. The Compressed Beamforming Report information may be utilized in HE-based communication, and thus may be referred to as HE Compressed Beamforming Report information or HE Compressed OFDMA Beamforming Report. In Table 4, the Compressed Beamforming Report information includes an average SNR for each of Nsb subbands in each of Nc space-time streams to be fed back to the beamformer. The Nsb is the total number of subbands for this sounding protocol. In an aspect, Nsb may be determined by subband information in the Nc Index field in the NDPA frame. The subbands may be indicated by the beamformer to the beamformees in the NPDA frame.

TABLE 4

Example of HE Compressed OFDMA Beamforming Report information

| Field | Size (bits) | Meaning |
|---|---|---|
| Average SNR of Space-Time Stream 1 in subband 1 | 8 | Signal-to-noise ratio at the beamformee for space-time stream 1 averaged over all data |

TABLE 4-continued

Example of HE Compressed OFDMA
Beamforming Report information

| Field | Size (bits) | Meaning |
|---|---|---|
| . . . | . . . | subcarriers in subband 1. See Table 8-53h. |
| | | . . . |
| Average SNR of Space-Time Stream 1 in subband Nsb | 8 | Signal-to-noise ratio at beamformee for space-time stream 1 averaged over all data subcarriers in subband Nsb. See Table 8-53h. |
| Average SNR of Space-Time Stream 2 in subband 1 | | Signal-to-noise ratio at the beamformee for space-time stream 2 averaged over all data subcarriers in subband 1. See Table 8-53h. |
| . . . | . . . | . . . |
| Average SNR of Space-Time Stream Nc in subband Nsb | | Signal-to-noise ratio at the beamformee for space-time stream Nc averaged over all data subcarriers in subband Nsb. See Table 8-53h. |
| Compressed Beamforming Feedback Matrix V for subcarrier k = scidx(0) | N α × ($b_\psi + b_\phi$)/2 | Compressed beamforming feedback matrix as defined in Table 8-53d (Order of angles in the Compressed Beamforming Feedback Matrix subfield) and Table 8-53e (Quantization of angles). |
| Compressed Beamforming Feedback Matrix V for subcarrier k = scidx(1) | N α × ($b_\psi + b_\phi$)/2 | Compressed beamforming feedback matrix as defined in Table 8-53d (Order of angles in the Compressed Beamforming Feedback Matrix subfield) and Table 8-53e (Quantization of angles). |
| Compressed Beamforming Feedback Matrix V for subcarrier k = scidx(2) | N α × ($b_\psi + b_\phi$)/2 | Compressed beamforming feedback matrix as defined in Table 8-53d (Order of angles in the Compressed Beamforming Feedback Matrix subfield) and Table 8-53e (Quantization of angles). |
| . . . | . . . | . . . |
| Compressed Beamforming Feedback Matrix V for subcarrier k = scidx(Ns − 1) | N α × ($b_\psi + b_\phi$)/2 | Compressed beamforming feedback matrix as defined in Table 8-53d (Order of angles in the Compressed Beamforming Feedback Matrix subfield) and Table 8-53e (Quantization of angles). |

NOTE
scidx( ) is defined in Table 8-53g (Subcarriers for which a Compressed Beamforming Feedback Matrix subfield is sent back)

In some aspects, each average SNR value may be n bits in size. Therefore, the total number of bits for all the average SNR values for each subband of each space-time stream may be given by Nsb×n×Nc. As an example, n may be 8 bits. It is noted that Nsb is the total number of subbands for a given sounding protocol. Nsb may be determined by subband information provided in the NDPA frame (e.g., in the Nc Index field in some aspects). Each average SNR value of a subband may be calculated by averaging over the SNR values obtained for each reported subcarrier in the subband. In an aspect, pilot subcarriers are not included in the calculation of the average SNR value. The reported subcarriers in a subband may be different from all subcarriers in the subband because of the pilot subcarriers. In an aspect, the reported subcarriers include only the subcarriers for data in the subband, and DC tones are not included in the average SNR values. In an aspect, the average SNR value for a subband (or each subband) may be averaged over fewer than all of the data subcarriers in the subband (or in each such subband). For instance, the SNR value may be determined for half of the data subcarriers (e.g., SNR value determined for every other subcarrier) in a subband (or each subband), and the average SNR value for the subband may be determined based on these determined SNR values.

In some aspects, some of the average SNR values or the beamforming feedback matrices may be omitted from the beamforming report. For instance, the beamforming report may include one or more average SNR values but not the beamforming feedback matrices.

In some aspects, the information to be included in the beamforming report may be different for each station. The beamformer may indicate the information to be included in the beamforming report in a STA Info field associated with each station. In this regard, with reference to Table 4, each station may have a respective number of subbands Nsb and a respective number of space-time streams Nc over which to generate beamforming information (e.g., average SNR values). The number of subbands Nsb for one station may be the same or may be different from the number of subbands Nsb for another station. The number of space-time streams Nc for one station may be the same or may be different from the number of space-time streams Nc for another station. In an aspect, the beamforming information may be generated for every space-time stream 1 through Nc, inclusive. In an aspect, the beamforming information is skipped for some of the space-time streams 1 through Nc. For example, the beamforming information may be provided for every other space-time stream. The subband(s) for each station may be defined differently. For example, the tone(s) in subband 1 of beamformee 1 may be different from the tone(s) in subband 1 of beamformee 2.

In one or more implementations, the subband-related information may be based on resource units that may be allocated to stations. In an aspect, the resource units that may be allocated for a channel bandwidth may be provided by a numerology. In an aspect, the beamformer is the access point that may allocate or has allocated the resource unit(s) to the beamformees. In an aspect, the beamformer and the beamformees are aware of the resource unit(s) assigned to the beamformees and/or the channel bandwidth.

Figure 8:
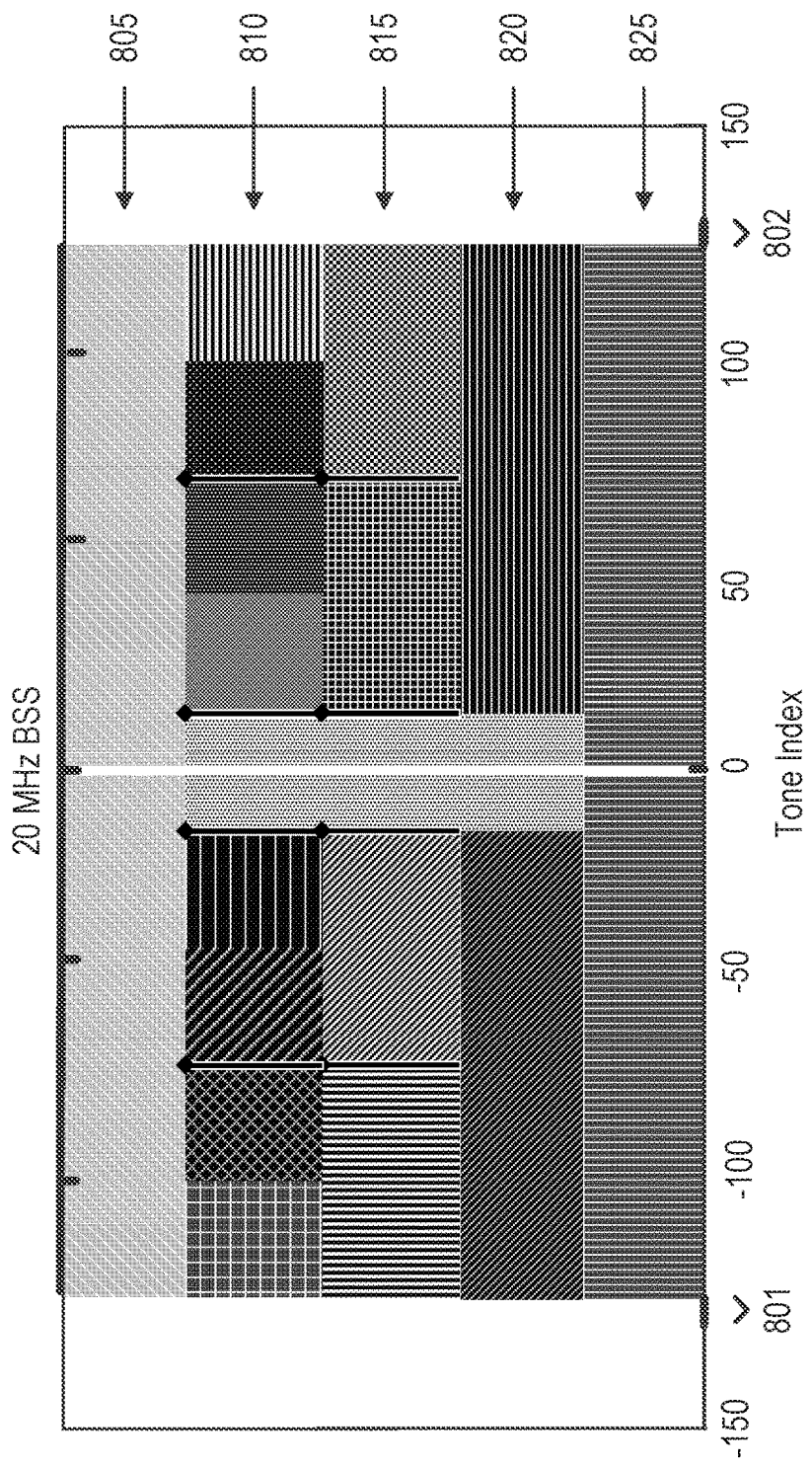
FIG. 8 illustrates an example of a numerology for a 20 MHz channel bandwidth.

FIG. 8 illustrates an example of a numerology for a 20 MHz channel bandwidth. The numerology provides different manners by which to allocate resources for the 20 MHz channel bandwidth into individual resource units. A resource unit contains tones, where each tone may be a data tone or a pilot tone. For a 20 MHz HE PPDU transmission, the 20 MHz may be divided into 256 tones with a 78.125 kHz spacing between tones. In the OFDMA case, tone indices −3, −2, −1, 0, +1, +2, and +3 may be direct current (DC) tones (i.e., 7 DC tones). In the non-OFDMA case (e.g., SU case), tone indices −1, 0, and +1 may be DC tones (i.e., 3 DC tones), and a signal may be transmitted on tone indices −122 to −2 and 2 to 122. Hence, there may be up to a total of 242 usable tones for the 20 MHz HE PPDU transmission, which do not include DC tones. The remaining 11 tones may be guard tones, where 6 tones may be for one edge of the bandwidth, and 5 tones may be for the other edge of the bandwidth. (See 801 and 802 in FIG. 8.) In one aspect, usable tones do not include DC tones or guard tones. In one aspect, DC tones are not allocated to any station.

A first row 805 illustrates an example of usable tones for a 20 MHz channel bandwidth. In one aspect, usable tones include data/pilot tones and any reserved tones. A data/pilot tone is a data tone or a pilot tone. A data/pilot tone is a tone that can be utilized as a data tone or a pilot tone. A reserved tone may be referred to as a null tone or left over tone. In an aspect, the reserved tone may have zero energy.

A second row 810 illustrates a resource allocation of the 20 MHz bandwidth into multiple resource units. In some aspects, the 20 MHz bandwidth may be allocated into 9 resource units. Each non-center resource unit includes 26 data/pilot tones. A center resource unit includes 26 data/pilot tones and 7 DC tones.

A third row 815 illustrates a resource allocation of the 20 MHz bandwidth into fewer, but generally larger, resource units than the resource allocation illustrated in the second row 810. In some aspects, the 20 MHz bandwidth may be allocated into 5 resource units in the following manner: 4 resource units (each including 52 data/pilot tones) and one center resource unit (including 26 data/pilot tones and 7 DC tones).

A fourth row 820 illustrates a resource allocation of the 20 MHz bandwidth into fewer, but generally larger, resource units than the resource allocation illustrated in the third row 815. In some aspects, as shown in the fourth row 820, the 20 MHz bandwidth may be allocated into 2 resource units (each including 106 data/pilot tones) and one center resource unit (including 26 data/pilot tones and 7 DC tones). In these aspects, no reserved tones are utilized. In some aspects (not shown), the 20 MHz bandwidth may be allocated into 3 resource units in the following manner: 2 resource units (each including 106 data/pilot tones) and one center resource unit (including 26 data/pilot tones and 3 DC tones).

For each of the resource allocations illustrated in the second row 810, third row 815, and fourth row 820, one station may be allocated to one or more of the resource units. For example, for the fourth row 820, a first station may be allocated to the leftmost resource unit containing 106 data/pilot tones, a second station may be allocated to the center resource unit containing 26 data/pilot tones, and/or a third station may be allocated to the rightmost resource unit containing 106 data/pilot tones. In some aspects, a station that is allocated to the center resource unit may not be allocated to any of the other resource units.

A fifth row 825 illustrates a resource allocation of the 20 MHz bandwidth into a single 242 tone resource unit. For example, the resource allocation may include, in order from the lowest usable tone index to the highest usable tone index: 121 data/pilot tones and 121 data/pilot tones. The allocation may be utilized for a non-OFDMA case, in which all the data/pilot tones (e.g., the 242 data/pilot tones) are allocated to a single STA.

Figure 9:
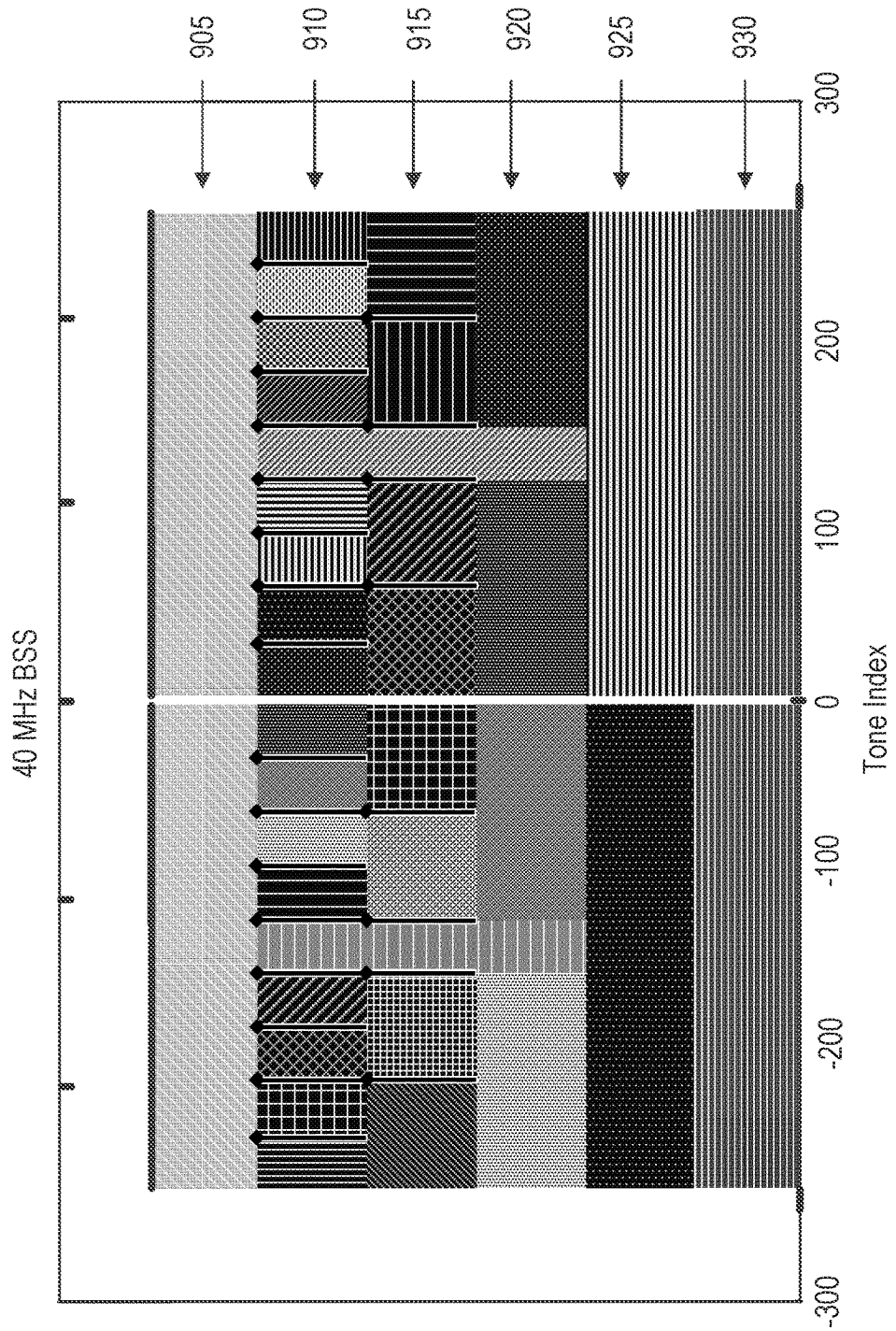
FIG. 9 illustrates an example of a numerology for a 40 MHz channel bandwidth.

FIG. 9 illustrates an example of a numerology for a 40 MHz channel bandwidth. For a 40 MHz HE PPDU transmission, the 40 MHz may be divided into 512 tones with a 78.125 kHz spacing between tones. In an aspect, a signal may be transmitted on tone indices −244 to −3 and +3 to +244, with the tone indices between −2 and +2, inclusive, being DC tones (i.e., 5 DC tones). In another aspect, a signal may be transmitted within a subset of the tone indices between −244 to −3 and +3 to +244. Hence, there may be up to a total of 484 usable tones (not including 5 DC tones). The remaining tones may be guard tones (e.g., 12 guard tones on the left edge and 11 guard tones on the right edge of the bandwidth). A first row 905 illustrates an example of usable tones spanning tone indices −244 to +244.

A second row 910 illustrates a resource allocation of the 40 MHz bandwidth into multiple resource units. In some aspects, the 40 MHz bandwidth may be allocated into 18 resource units that include 26 data/pilot tones each.

A third row 915 illustrates a resource allocation of the 40 MHz bandwidth into fewer, but generally larger, resource units than the resource allocation illustrated in the second row 910. In some aspects, the 40 MHz bandwidth may be allocated into a total of 10 resource units, having (a) 8 resource units that include 52 data/pilot tones each and (b) 2 resource units that include 26 data/pilot tones each.

A fourth row 920 illustrates a resource allocation of the 40 MHz bandwidth into fewer, but generally larger, resource units than the resource allocation illustrated in the third row 915. In some aspects, the 40 MHz bandwidth may be allocated into a total of 6 resource units, having (a) 4 resource units that include 106 data/pilot tones each and (b) 2 resource units that include 26 data/pilot tones each. In such aspects, no reserved tones are utilized.

A fifth row 925 illustrates a resource allocation of the 40 MHz bandwidth into fewer, but generally larger, resource units than the resource allocation illustrated in the fourth row 920. In some aspects, the 40 MHz bandwidth may be allocated into 2 resource units that include 242 data/pilot tones each. In such implementations, no reserved tones are utilized.

For each of the allocations illustrated in the second through fifth rows of FIG. 9, one STA may be allocated to one or more of the resource units. For example, for the fifth row 925, one STA may be allocated to one of the 242-tone resource unit, and another STA may be allocated to the other of 242-tone resource unit.

A sixth row 930 illustrates a resource allocation of the 40 MHz bandwidth into a single resource unit with 484 non-DC tones. For example, the single resource unit may include, in order from the lowest usable tone index to the highest usable tone index: 242 data/pilot tones and 242 data/pilot tones. The single resource unit may be utilized for a non-OFDMA case, in which all the data/pilot tones are allocated to a single STA.

Figure 10:
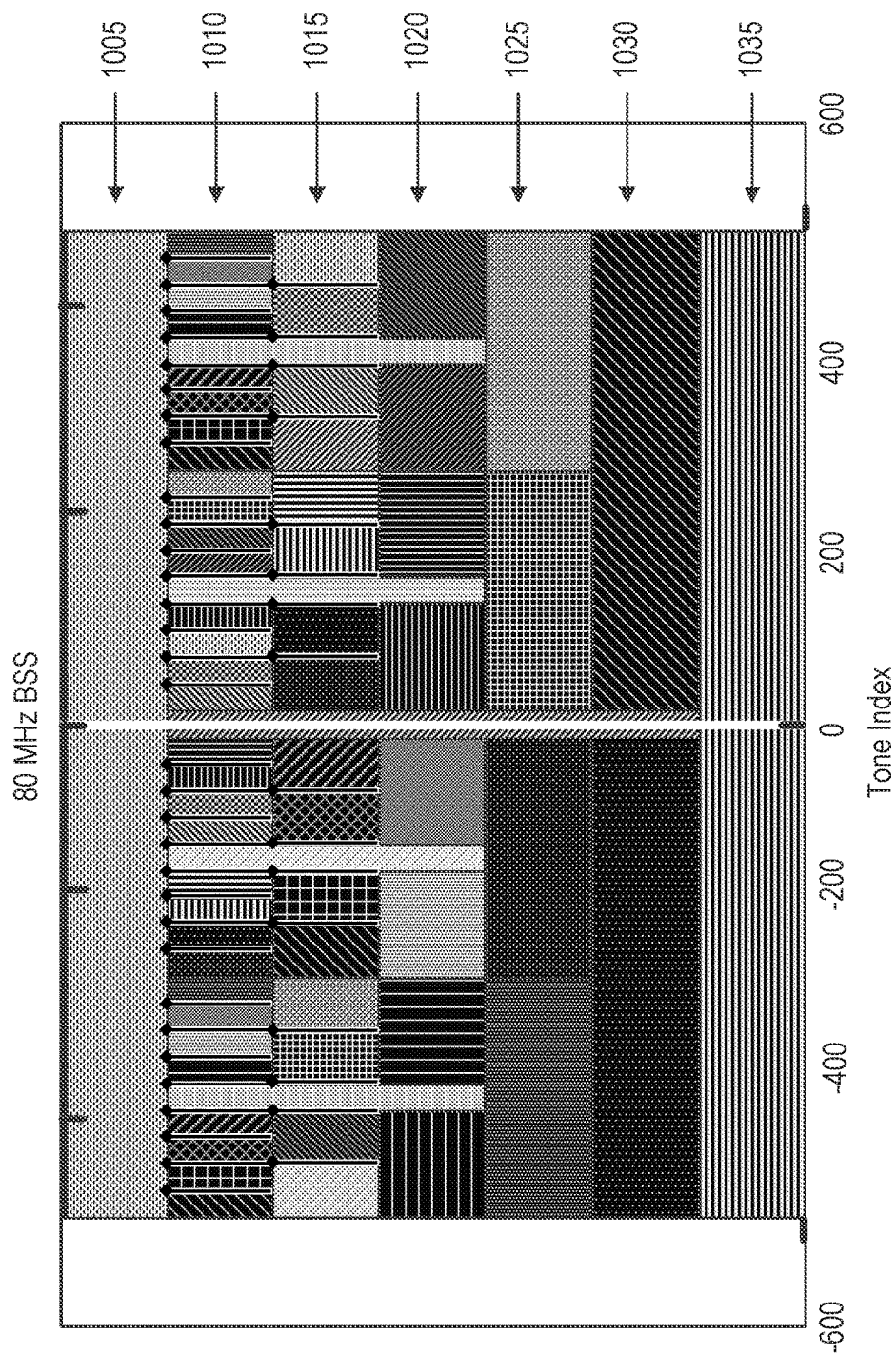
FIG. 10 illustrates an example of a numerology for a 80 MHz channel bandwidth.

FIG. 10 illustrates an example of a numerology for an 80 MHz channel bandwidth. For an 80 MHz HE PPDU transmission, the 80 MHz may be divided into 1024 tones with a 78.125 kHz spacing between tones. In some aspects, the number of usable tones for the OFDMA case may be different from the number of usable tones for the non-OFDMA case. In some aspects, the number of DC tones for the OFDMA case may be different from the number of DC tones for the non-OFDMA case.

For an 80 MHz HE PPDU transmission for the OFDMA case, in an aspect, a signal may be transmitted on tones −500 to −4 and +4 to +500, with the tones between −3 and +3, inclusive, being DC tones (i.e., 7 DC tones). In this example, the number of usable tones may be 994, not including the DC tones. The remaining tones may be guard tones (e.g., 12 guard tones on the left edge and 11 guard tones on the right edge). In another aspect, a signal may be transmitted within a subset of the tone indices between −500 to −4 and +4 to +500.

For an 80 MHz HE PPDU transmission for the non-OFDMA case, a signal may be transmitted on tones −500 to −3 and +3 to +500, with the tones between −2 and +2, inclusive, being DC tones (i.e., 5 DC tones). In this example, the number of usable tones may be 996 (excluding the DC tones). The remaining tones may be guard tones (e.g., 12 guard tones on the left edge and 11 guard tones on the right edge).

A first row 1005 illustrates usable tones. The usable tones may span tone indices −500 to +500 for the OFDMA case (excluding −3 to +3 for 7 DC tones) and tone indices −500 to +500 for the non-OFDMA case (excluding −2 to +2 for 5 DC tones).

A second row 1010 illustrates a resource allocation of the 80 MHz bandwidth into multiple resource units. In one or more implementations, the 80 MHz bandwidth may be allocated into a total of 37 resource units, having (a) 36 resource units that include 26 data/pilot tones each and (b) a center resource unit that includes 26 data/pilot tones. In one or more implementations, a station that is allocated to the center resource unit may not be allocated to any of the other resource units.

A third row 1015 illustrates a resource allocation of the 80 MHz bandwidth into fewer, but generally larger, resource units than the resource allocation illustrated in the second row 1010. In one or more implementations, the 80 MHz bandwidth may be allocated into a total of 21 resource units, having (a) 16 resource units that include 52 data/pilot tones each, (b) 4 resource units that include 26 data/pilot tones each, and (c) a center resource unit that includes 26 data/pilot tones.

A fourth row 1020 illustrates a resource allocation of the 80 MHz bandwidth into fewer, but generally larger, resource units than the resource allocation illustrated in the third row 1015. In some aspects, the 80 MHz bandwidth may be allocated into a total of 13 resource units, having (a) 8 resource units that include 106 data/pilot tones each, (b) 4 resource units that include 26 data/pilot tones each, and (c) a center resource unit that includes 26 data/pilot tones.

A fifth row 1025 illustrates a resource allocation of the 80 MHz bandwidth into fewer, but generally larger, resource units than the resource allocation illustrated in the fourth row 1020. In some aspects, the 80 MHz bandwidth may be allocated into a total of 5 resource units, having (a) 4 resource units that include 242 data/pilot tones each and (b) a center resource unit that includes 26 data/pilot tones. In such aspects, no reserved tones are utilized.

A sixth row 1030 illustrates a resource allocation of the 80 MHz bandwidth into fewer, but generally larger, resource units than the resource allocation illustrated in the fifth row 1025. In some aspects, the 80 MHz bandwidth may be allocated into a total of 3 resource units, having (a) 2 resource units that include 484 data/pilot tones each and (b) a center resource unit that includes 26 data/pilot tones. In such aspects, no reserved tones are utilized.

A seventh row 1035 illustrates a resource allocation of the 80 MHz bandwidth into a single resource unit (e.g., non-OFDMA case). In some aspects, the non-OFDMA case utilizes 5 DC tones, and thus the single resource unit contains 996 non-DC tones.

In some aspects, with reference to FIGS. 8-10, the 26 data/pilot tone resource unit may be a 24 data tone based resource unit, since a 26-tone resource unit may include 24 data tones and 2 pilot tones. Similarly, in some aspects, the 52 data/pilot tone resource unit may be a 48 data tone based resource unit, the 106 data/pilot tone resource unit may be a 102 data tone based resource unit when 4 pilot tones are utilized per resource unit, the 106 data/pilot tone resource unit may be a 102 data tone based resource unit when 4 pilot tones are utilized per resource unit and the 242 data/pilot tone resource unit may be a 234 data tone based resource unit, and the 484 data/pilot tone resource unit may be a 468 data tone based resource unit.

In one or more implementations, a resource allocation for a 160 MHz channel bandwidth may be obtained through multiple (e.g., eight) duplications of the resource allocation for 20 MHz channel bandwidth, through multiple (e.g., four) duplications of the resource allocation for 40 MHz channel bandwidth, or through duplications (e.g., two) of the resource allocation for 80 MHz channel bandwidth.

In one or more implementations, a resource allocation for 80+80 MHz channel bandwidths can be obtained through multiple (e.g., eight) duplications of the resource allocation for 20 MHz channel bandwidth, through multiple (e.g., four) duplications of the resource allocation for 40 MHz channel bandwidth, or through duplications (e.g., two) of the resource allocation for 80 MHz channel bandwidth.

In one or more implementations, the subband-related information may be based on the numerologies provided in FIGS. 8, 9, and 10. For example, the subband-related information may be indicative of one or more resource units in a numerology. Although FIGS. 8, 9, and 10 provide numerologies that may be utilized for allocation of a 20 MHz, 40 MHz, and 80 MHz channel bandwidth, respectively, into resource units, other manners (e.g., numerologies) by which to allocate the channel bandwidth may be utilized.

In one or more implementations, the subband-related information associated with each beamformee may be contained in the Nc Index field of the STA Info field associated with the beamformee. In other words, the beamformer may signal the subband-related information to each beamformee using the Nc Index field of the respective STA Info field associated with each beamformee. In other implementations, the subband information may be contained in another part of an NDPA frame and/or in another frame (e.g., not in the NDPA frame). In some cases, the Nc Index field may be 3 bits, which may allow for up to 8 different states (e.g., values) that can be contained in the Nc Index field. In other cases, the Nc Index field may be fewer or more than 3 bits, allowing for fewer than or more than 8 different states. For simplicity of description, the subband information is described as being included in the Nc Index field.

In one aspect, the Nc Index field may be used to indicate full band feedback or subband-unit feedback. For example, for full band feedback, the station may provide average SNR values over the entire operating channel bandwidth (e.g., 20 MHz, 40 MHz, 80 MHz, 160 MHz). For subband-unit feedback, the station may provide average SNR values over one or more subband units. The subband-unit may be a minimum size of a subband. With reference to the numerologies of FIGS. 8-10, the minimum size may be a 26-tone (e.g., 2 MHz) subband, since the smallest resource unit, minimum bandwidth of channel allocation for the OFDMA case, is 26 tones. In an aspect, an AP (e.g., beamformer) may signal to the station subbands for which the AP is requesting feedback from the station in terms of subband-units. For instance, the AP may signal the station to provide average SNR values for the four left-most subband units (e.g., 4 resource units of 26 tones each). In an aspect, the station may provide average SNR values over each subband unit contained in the entire operating channel bandwidth. As an example, in the first row 805 of FIG. 8, the 20 MHz bandwidth may be divided into 9 subband units (e.g., 9 resource units of 26 tones each), and the station may provide one average SNR value for each of the 9 subband units. The Nc Index field may be set to one value (e.g., 7) for full band feedback and another value (e.g., 0) for subband-unit feedback.

In an aspect, the state (e.g., value) of the Nc Index field may be used to indicate a granularity (e.g., size of subband) for feedback. For example, with reference to the numerologies illustrated in FIGS. 8-10, the Nc Index field may be set to one of the following values:

Set to 0 for 24-data tone based RU (26-tone based RU=24 data+2 pilot);

Set to 1 for 48-data tone based RU (52-tone based RU=48 data+4 pilot);

Set to 2 for 102-data tone based RU (106 or 108-tone based RU depending on number of pilots per RU);

Set to 3 for 234-data tone based RU (242-tone based RU);

Set to 4 for 468-data tone based RU (484-tone based RU);

. . .

Set to 7 for full band feedback.

In an aspect, some states are not used with some channel bandwidths. For example, for a 20 MHz channel bandwidth, the Nc Index field may be set to 0, 1, 2, 3, and 7, but not 4, 5, and 6 (e.g., 4, 5, and 6 may be unspecified or otherwise have no meaning for 20 MHz channel bandwidth).

As another example, the Nc Index field may be set to one of the following values to indicate the size of a subblock for feedback:

Set to 0 for 26-tone based feedback (e.g., 2 MHz subblock);

Set to 1 for 52-tone based feedback (e.g., 4 MHz subblock);

Set to 2 for 102+(4 or 6 pilots)-tone based feedback (e.g., 8 MHz);

Set to 3 for 242-tone based feedback (e.g., 20 MHz);

Set to 4 for 484-tone based feedback (e.g., 40 MHz);

. . .

Set to 7 for full band feedback.

In an aspect, each state of the Nc Index field may correspond to a type in a given OFDMA numerology. For example, each type may refer to a row of the numerology. For 20 MHz channel bandwidth:

Set to 0 for a first type (8×26-tone RU+1 center 26-tone RU) provided in the second row 810 of FIG. 8;

Set to 1 for a second type (2×52-tone RU+1 center 26-tone RU) provided in the third row 815 of FIG. 8

Set to 2 for a third type (2×(106 or 108)-tone+1 center 26-tone RU) provided in the fourth row 820 of FIG. 8

. . .

Set to 7 for full band feedback

For 40 MHz channel bandwidth:

Set to 0 for 2×(8×26-tone RU+26-tone RU) provided in the second row 910 of FIG. 9;

Set to 1 for 2×(2×52-tone RU+26-tone RU) provided in the third row 915 of FIG. 9;

Set to 2 for 2×(2×(106 or 108)-tone RU+26-tone RU) provided in the fourth row 920 of FIG. 9;

Set to 3 for 2×242-tone RU provided in the fifth row 925 of FIG. 9;

. . .

Set to 7 for full band feedback

For 80 MHz channel bandwidth:

Set to 0 for 2×(18×26-tone RU)+1 center 26-tone RU provided in the second row 1010 of FIG. 10;

Set to 1 for 4×(4×52-tone RU+26-tone RU)+1 center 26-tone RU provided in the third row 1015 of FIG. 10;

Set to 2 for 4×242 tone RU+1 center 26-tone RU provided in the fifth row 1025 of FIG. 10;

Set to 3 for 2×484 tone RU+1 center 26-tone RU provided in the sixth row 1030 of FIG. 10;

. . .

Set to 7 for full band feedback

It is noted that the ellipses separating a state of the Nc Index field from the full band feedback state in the examples above may indicate that one or more additional states or no state are present between the states.

In an aspect, each state of the Nc Index field may be a preferred band information. For a given channel bandwidth, each beamformee (e.g., non-AP station) may have a preferred subband(s) from the perspective of the beamformer (e.g., AP). In such cases, when the beamformer sends an NDPA frame (e.g., 512 in FIG. 5) to beamformee(s), the beamformer may indicate preferred subband(s) for each beamformee in the Nc Index field of the STA Info field corresponding to the beamformee. In one aspect, with this approach, the size of feedback may be reduced relative to a case in which subbands span the entire channel bandwidth since the beamformer is requesting feedback for less than the entire channel bandwidth. For example, the number of elements of the compressed beamforming feedback matrix V for subcarrier k (e.g., shown in Tables 2 and 4) can be reduced. In other words, in this approach, a station does not need to send feedback matrices V for all subcarrier index k in the channel bandwidth or for all subcarrier groupings (e.g., the Grouping field of the MIMO Control field shown in FIG. 7A), rather the station may send back feedback matrices V only for subcarriers or subcarrier groupings within the preferred subbands informed by the beamformer via the NDPA frame.

In one or more implementations, an order of priority may be allocated to different states of the Nc Index field. In the examples provided above, the Nc Index field is assumed to be at least three bits to accommodate up to eight states. If there is a lack of available bits in the Nc Index field (e.g., fewer than three bits and/or more than eight states), states may be allocated in a descending order of subband size and/or the center 26-tone RU may have the lowest order in the mapping. In an aspect, a wider subband may have higher priority than narrower subbands, and the center 26-tone may have lower priority than a normal (e.g., non-center) 26-tone subband.

Figure 11:
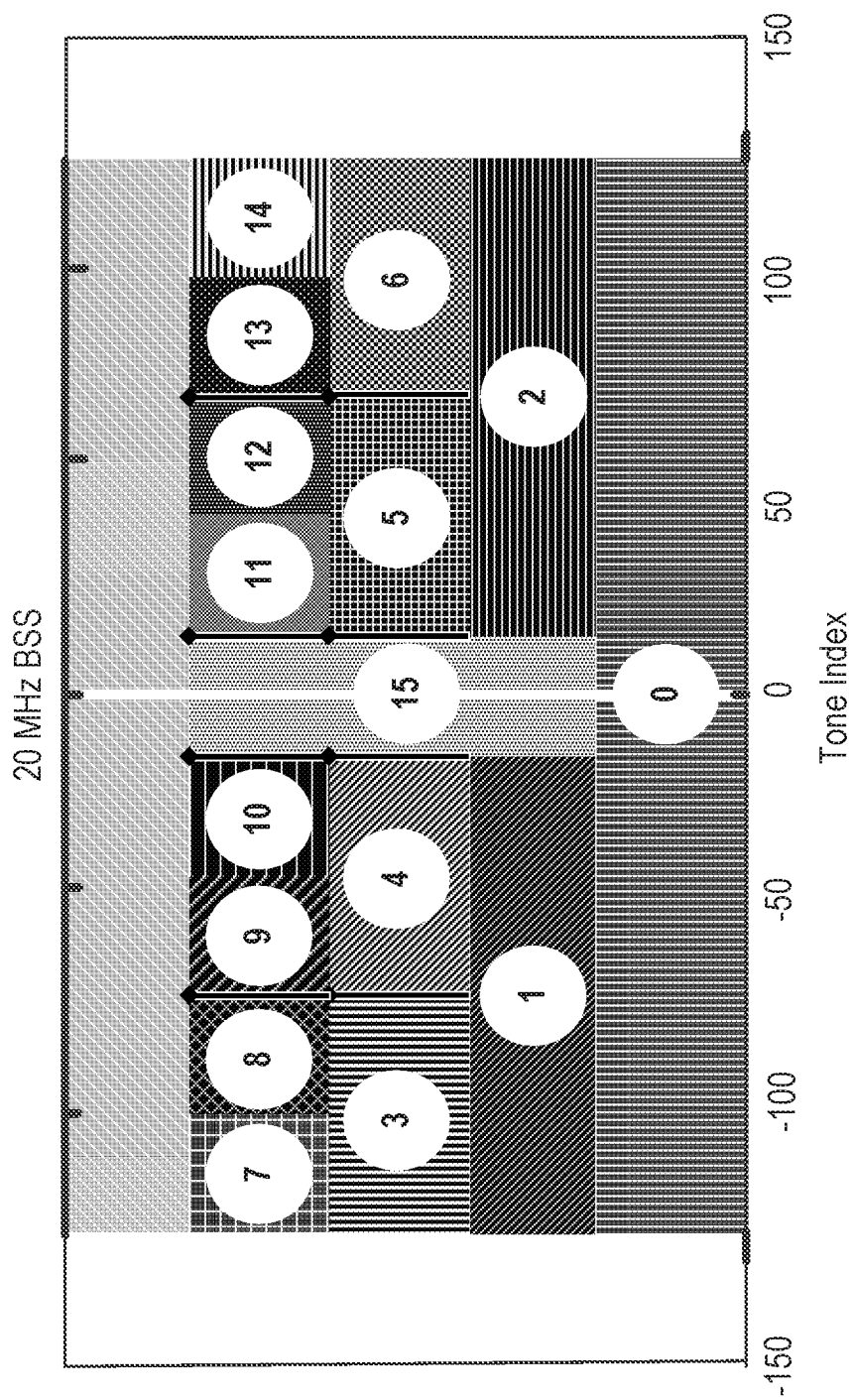
FIGS. 11, 12A, and 12B illustrate examples of an order of priority for allocating the states in the case of a 20 MHz channel bandwidth.

FIG. 11 illustrates an example of an order of priority for allocating the states in the case of a 20 MHz channel bandwidth. In particular, FIG. 11 illustrates the numerology of FIG. 8 together with a priority for each of the possible resource units defined in the numerology. If the NDPA frame allows for at least four bits for the subband-related information, each of the resource units labeled 0 through 15 in FIG. 11 may be represented using four bits. In a case where the NDPA frame has fewer than four bits for the subband-related information (e.g., the Nc Index field is three bits), some of the states may be excluded. For example, if three bits are utilized for the subband-related information, the NDPA frame may identify the RUs labeled 0 through 7 using the subband-related information but not the RUs 8 through 15.

Figure 12A:
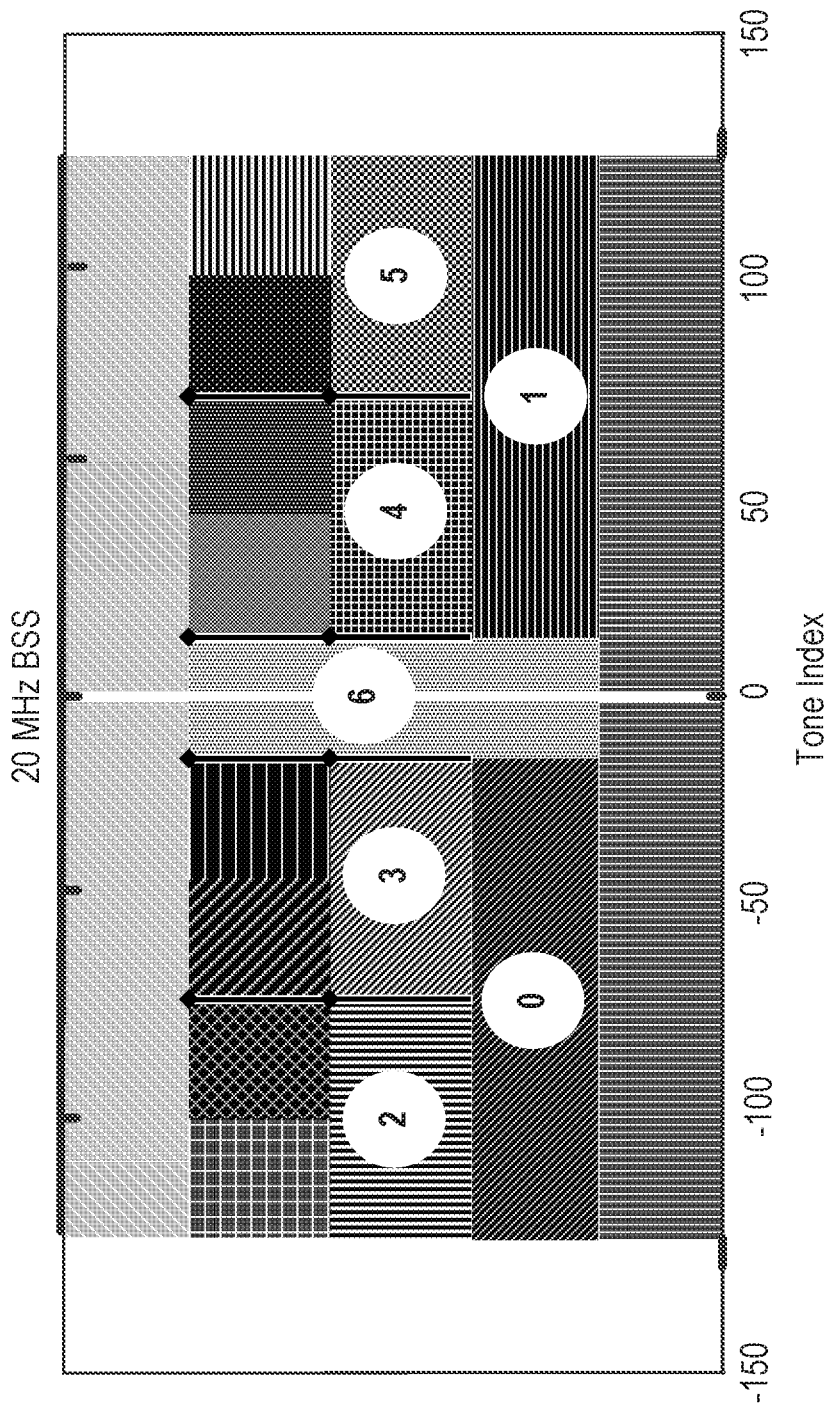
Figure 12B:
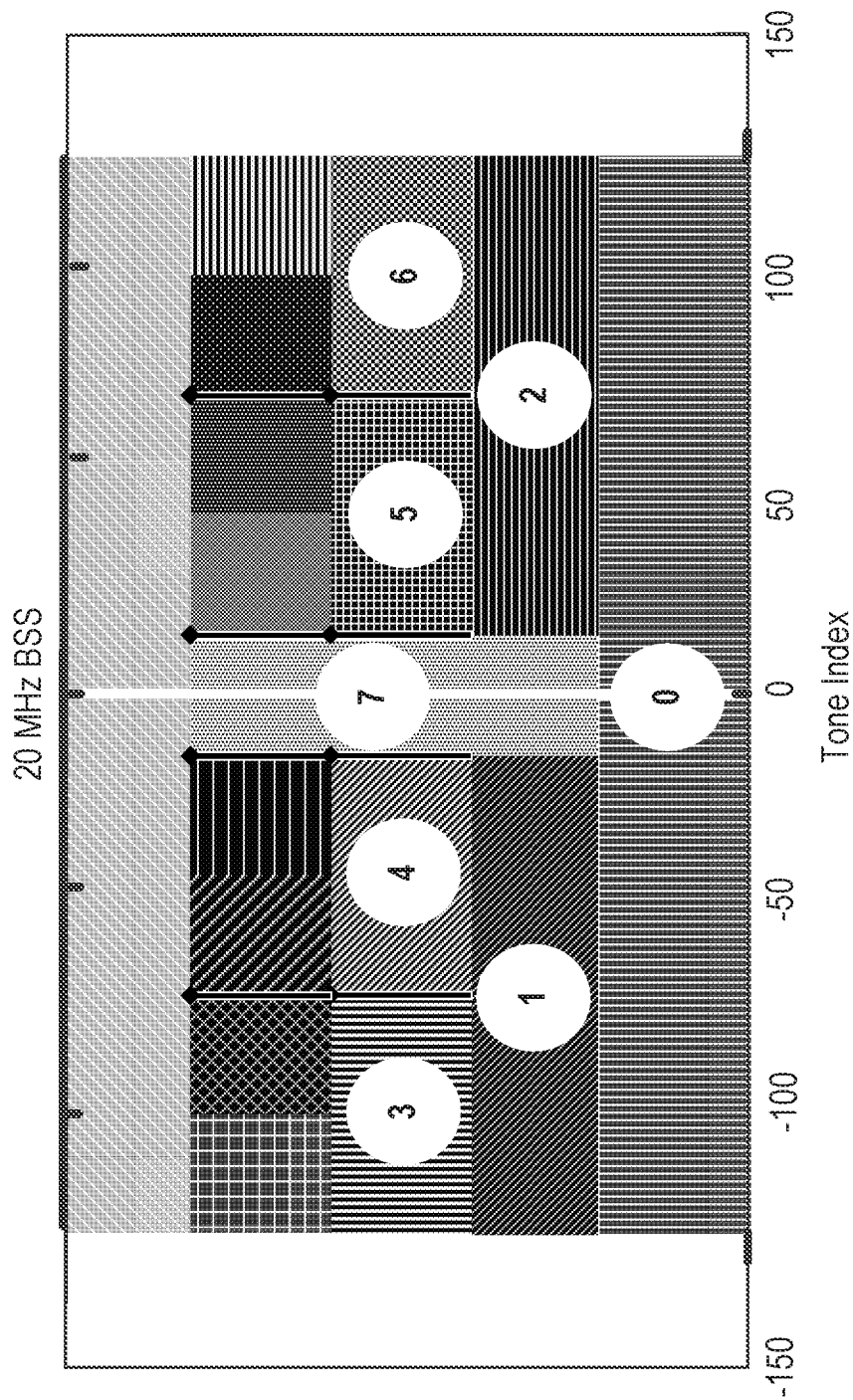

FIGS. 12A and 12B illustrate other examples of an order of priority for allocating the states in in the case of a 20 MHz channel bandwidth. In FIG. 12A, the order excludes the non-OFDMA allocation. If there are three available bits for the subband information, then the indication may be limited to indicating 52-tone RUs. The 26-tone RU may be excluded except for the center 26-tone, which may be included as a special RU. In FIG. 12B, the order includes the non-OFDMA allocation. Other mapping between the indications and preferred subbands may be utilized.

Figure 13:
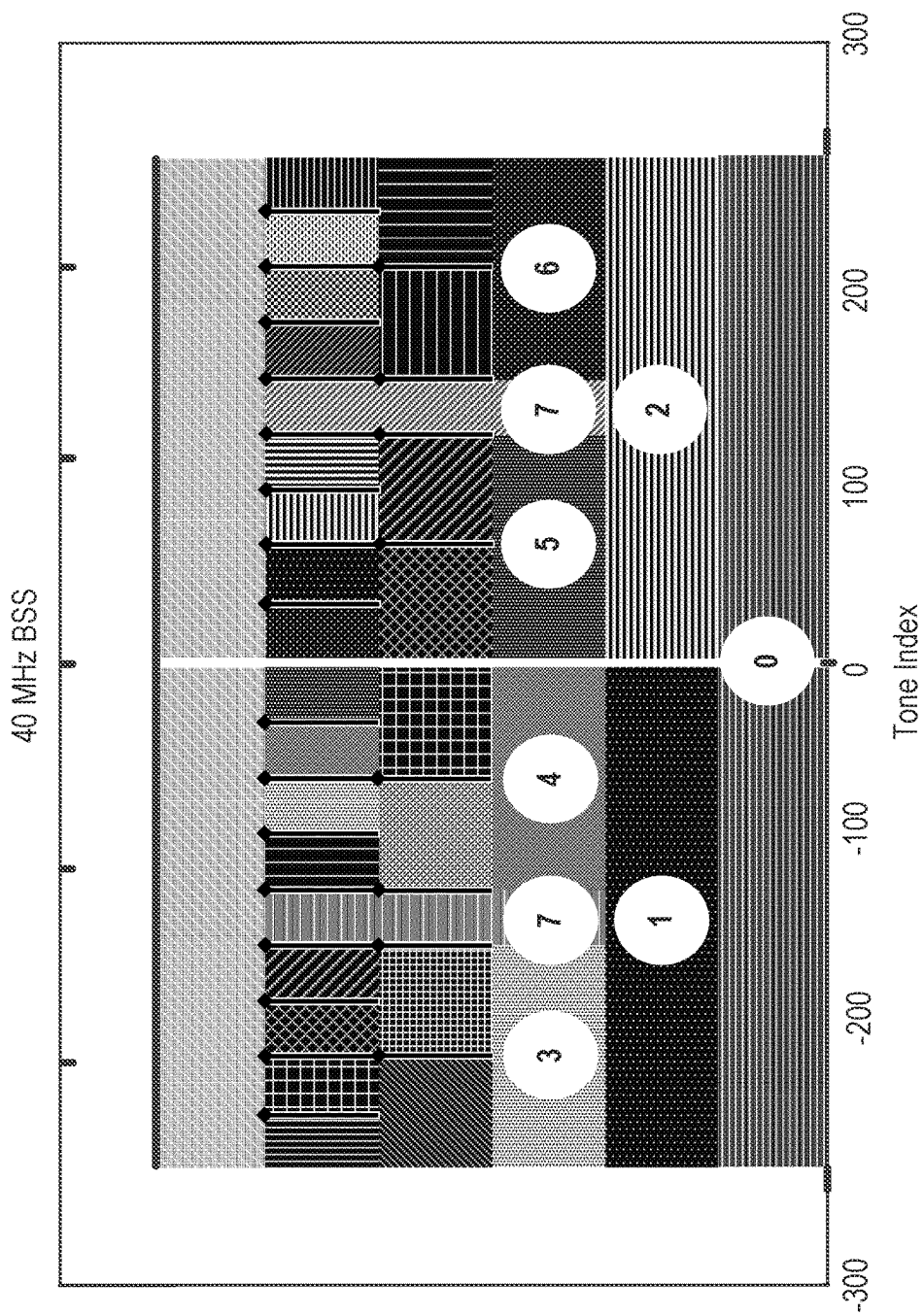
FIG. 13 illustrates an example of an order of priority for allocating the states in the case of a 40 MHz channel bandwidth.

Similar descending order of preferred band mapping may also be applied to other channel bandwidths. FIG. 13 illustrates an example of an order of priority for allocating the states in the case of a 40 MHz channel bandwidth. In such an example, three available bits may be utilized in the subband-related information. In FIG. 13, the non-OFDMA allocation is included in this indication, and the two 26-tone RUs are indicated using the same value (e.g., 7). In an aspect, the importance of these two 26-tone RUs may be less than that of the other indicated subbands (e.g., 0 through 6).

Figure 14:
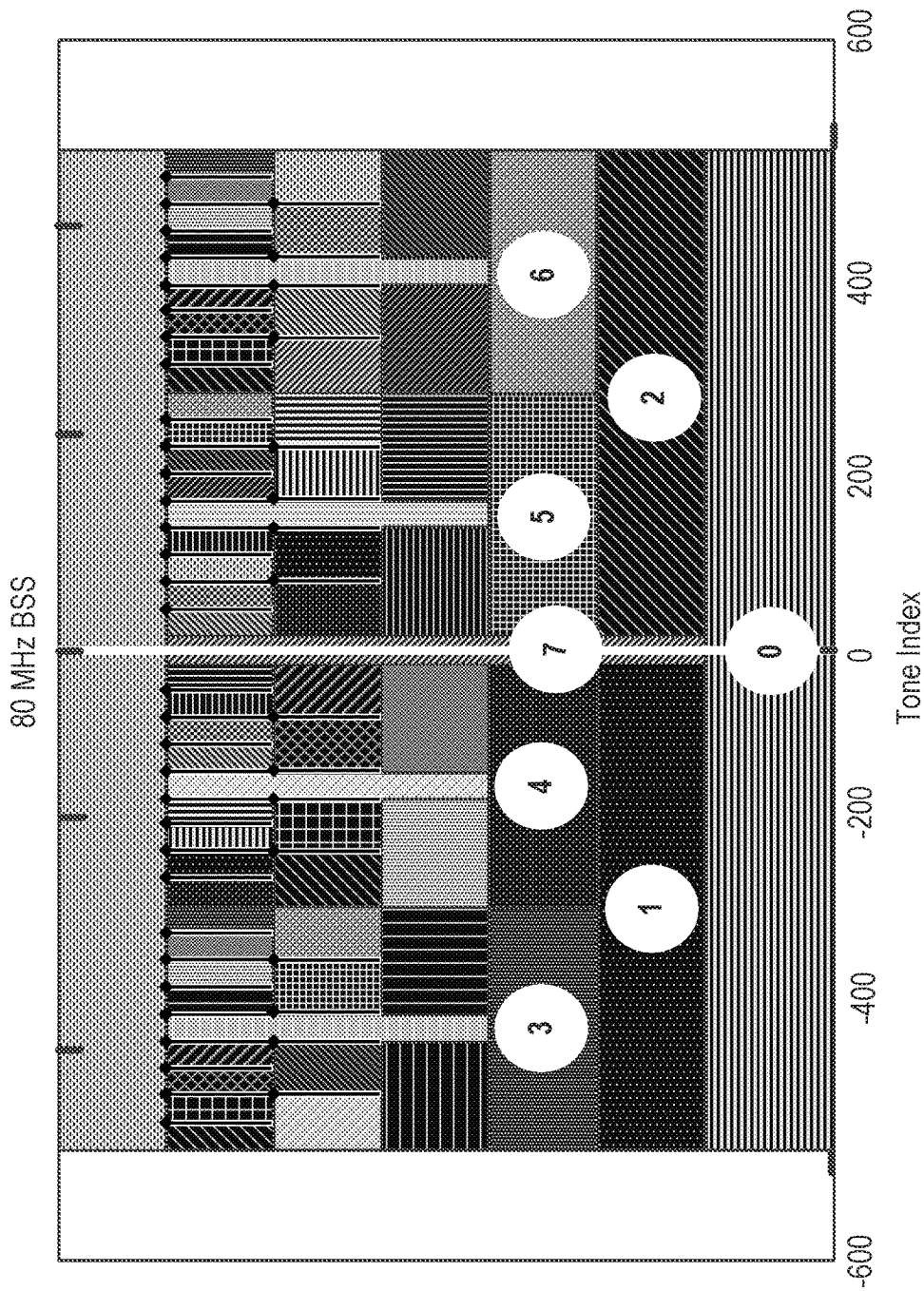
FIG. 14 illustrates an example of an order of priority for allocating the states in the case of an 80 MHz channel bandwidth.

FIG. 14 illustrates an example of an order of priority for allocating the states in the case of an 80 MHz channel bandwidth.

Although FIGS. 11, 12A, 12B, 13, and 14 provide examples of order of priority for allocating the states for different channel bandwidths, other mapping between the indications and preferred subbands may be utilized. If there are more available bits for the subband-related information, the indications may be extended to allow finer granularity in the subbands.

In an aspect, common station information in which a subband size is configured may be included in the NDPA frame, and all related stations of a sounding protocol may send back relevant information based on the subband size indicated in the common station information. In an aspect, the NDPA frame may indicate the subband size to be a smallest resource unit size (e.g., 26-tone resource unit), which is associated with minimum granularity.

In an aspect, a combination of different subband sizes may be provided using K assignments. The number of assignments K may be indicated by the NDPA frame, where K is the number of assignment blocks in a given PPDU. As shown in Table 5, for example, when K=3, 4, 5, there is only one assignment of a 26-tone resource unit, which is located in the center of the channel bandwidth. Since the center 26-tone resource unit might have worse PHY performance (e.g., due to lack of LTF tones and/or tone erasures), feedback information for larger sized subbands may be more valuable than feedback information for the center 26-tone resource unit. In Table 5, 1×26 is a 26-tone resource unit, 2×26 is 52-tone resource unit, and 102+P is a 102 data tone based resource unit with P pilot tones.

TABLE 5

Example of K factor and assignment configuration

| K (assignments) | 1 × 26 | 2 × 26 | 102 + P |
|---|---|---|---|
| 3 | 1 | 0 | 2 |
| 4 | 1 | 2 | 1 |
| 5 | 1 | 4 | 0 |
| 6 | 3 | 3 | 0 |
|   | 5 | 0 | 1 |
| 7 | 5 | 2 | 0 |
| 8 | 7 | 1 | 0 |
| 9 | 9 | 0 | 0 |

The subject disclosure may be utilized in connection with "802.11ac-2013—IEEE Standard for Information technology—Telecommunications and information exchange between systems-Local and metropolitan area networks—Specific requirements—Part 11: Wireless LAN Medium Access Control (MAC) and Physical Layer (PHY) Specifications-Amendment 4: Enhancements for Very High Throughput for Operation in Bands below 6 GHz," published Dec. 18, 2013 (IEEE Standard), which is incorporated herein by reference in its entirety and includes, for example, IEEE Standard's Tables 8-53d, 8-53e, 8-53g, 8-53h, 8-53i, and 8-53j, which are referenced above in this disclosure.

It should be noted that like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

Figure 15A:
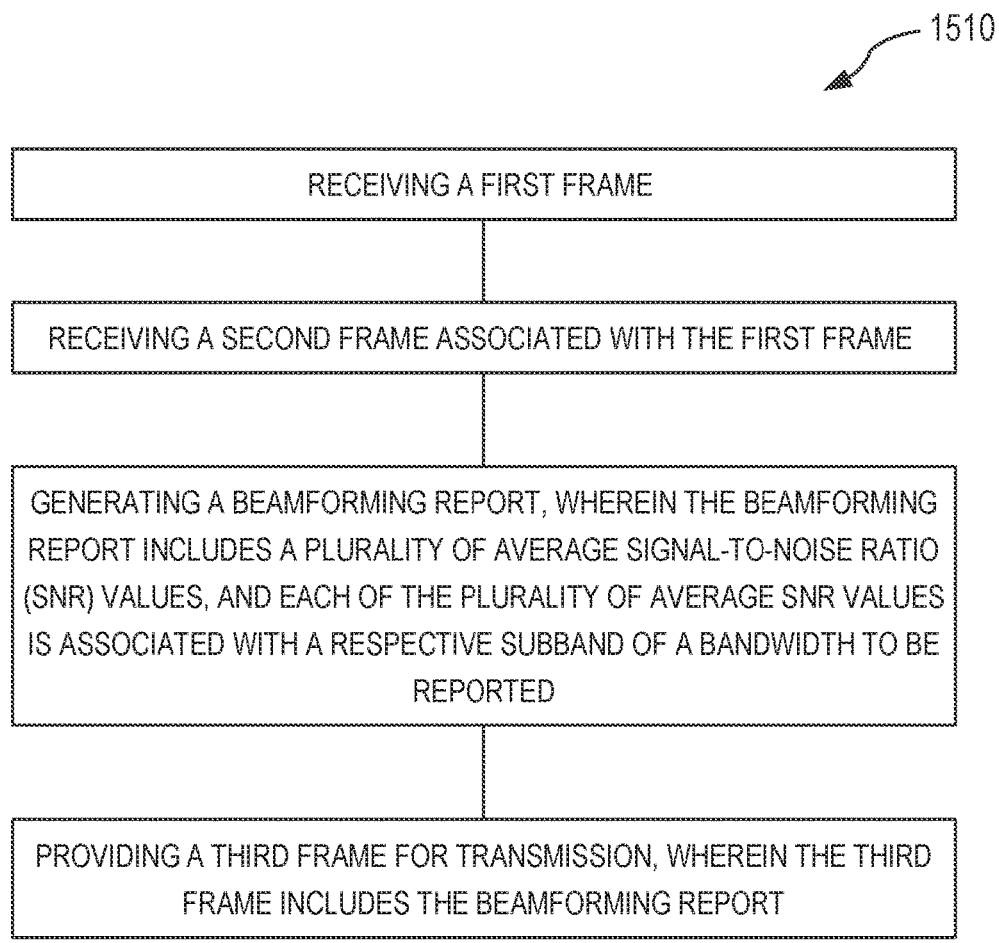
FIGS. 15A, 15B, and 15C illustrate flow charts of examples of methods for facilitating wireless communication for multi-user transmission.
Figure 15B:
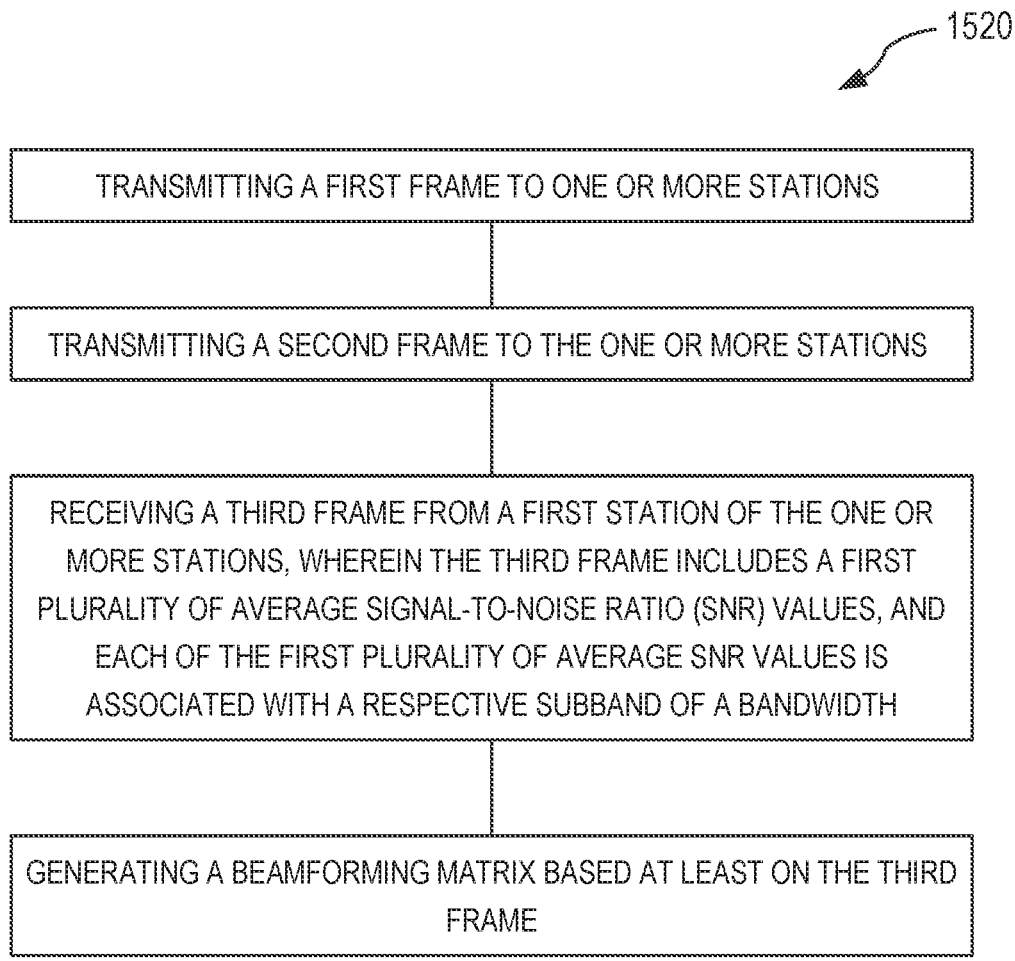
Figure 15C:
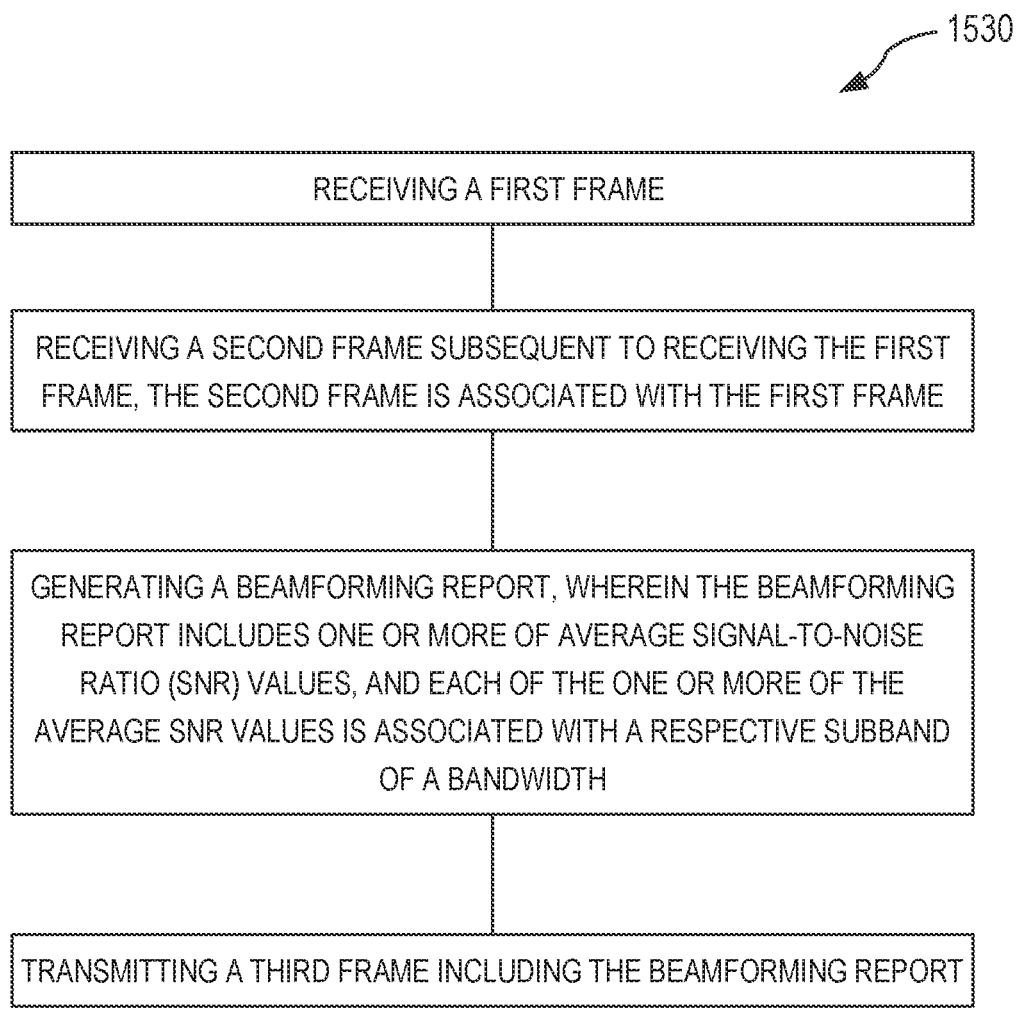

FIGS. 15A, 15B and 15C illustrate flow charts of examples of methods for facilitating wireless communication. For explanatory and illustration purposes, the example processes 1510, 1520 and 1530 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 1510, 1520 and 1530 are not limited to the wireless communication devices 111-115 of FIG. 1 or their components, and the example processes 1510, 1520 and 1530 may be performed by some of the devices shown in FIG. 1, or other devices or components. Further for explanatory and illustration purposes, the blocks of the example processes 1510, 1520 and 1530 are described herein as occurring in serial or linearly. However, multiple blocks of the example processes 1510, 1520 and 1530 may occur in parallel. In addition, the blocks of the example processes 1510, 1520 and 1530 need not be performed in the order shown and/or one or more of the blocks/actions of the example processes 1510, 1520 and 1530 need not be performed.

Various examples of aspects of the disclosure are described below as clauses for convenience. These are provided as examples, and do not limit the subject technology. As an example, some of the clauses described below are illustrated in FIGS. 15A, 15B and 15C.

Clause A. A station for facilitating communication in a wireless network for multi-user transmission, the station comprising: one or more memories; and one or more processors coupled to the one or more memories, the one or more processors configured to cause: receiving a first frame; receiving a second frame associated with the first frame; generating a beamforming report, wherein the beamforming report comprises a plurality of average signal-to-noise ratio (SNR) values, and each of the plurality of average SNR values is associated with a respective subband of a bandwidth to be reported; and providing a third frame for transmission, wherein the third frame comprises the beamforming report.

Clause B. An access point for facilitating communication in a wireless network for multi-user transmission, the access point comprising: one or more memories; and one or more processors coupled to the one or more memories, the one or more processors configured to cause: transmitting a first frame to one or more stations; transmitting a second frame to the one or more stations; receiving a third frame from a first station of the one or more stations, wherein the third frame comprises a first plurality of average signal-to-noise ratio (SNR) values, and each of the first plurality of average SNR values is associated with a respective subband of a bandwidth; and generating a beamforming matrix based at least on the third frame.

Clause C. A computer-implemented method of facilitating communication in a wireless network for multi-user transmission, the method comprising: receiving a first frame; receiving a second frame subsequent to receiving the first frame, the second frame is associated with the first frame; generating a beamforming report, wherein the beamforming report comprises one or more of average signal-to-noise ratio (SNR) values, and each of the one or more of the average SNR values is associated with a respective subband of a bandwidth, and transmitting a third frame comprising the beamforming report.

In one or more aspects, additional clauses are described below.

A method comprising one or more methods or operations described herein.

An apparatus or a station comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus or a station comprising one or more memories (e.g., 240, one or more internal, external or remote memories, or one or more registers) and one or more processors (e.g., 210 or one or more portions), wherein the one or more memories store instructions that, when executed by the one or more processors, cause the one or more processors to perform one or more methods or operations described herein.

An apparatus or a station comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

A computer-readable storage medium (e.g., 240, one or more internal, external or remote memories, or one or more registers) storing instructions that, when executed by one or more processors (e.g., 210 or one or more portions), cause the one or more processors to perform one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A station for facilitating communication in a wireless network for multi-user transmission, the station comprising:
   one or more memories; and
   one or more processors coupled to the one or more memories, the one or more processors configured to cause:
      receiving a first frame, wherein the first frame indicates whether a first type of feedback or a second type of feedback is requested;
      receiving a second frame associated with the first frame;
      generating a beamforming report, wherein the beamforming report comprises a plurality of average signal-to-noise ratio (SNR) values for the first and second types of feedback, wherein each of the plurality of average SNR values is associated with a respective subband of a bandwidth to be reported, wherein a size of each respective subband is 26 tones, wherein the 26 tones correspond to 26 tones in a smallest resource unit of a numerology of orthogonal frequency division multiple access (OFDMA) transmission associated with a channel bandwidth of the second frame, and wherein the beamforming report includes a delta SNR value for each reported subcarrier of the respective subband of the bandwidth to be reported when the first frame indicates that the second type of feedback is requested, the delta SNR value indicating a deviation of an SNR value of a reported subcarrier relative to an average SNR value averaged over subcarriers for a subband of the bandwidth; and
      providing a third frame for transmission, wherein the third frame comprises the beamforming report,
      wherein the first frame comprises station-specific information associated with an allocation of subbands of the bandwidth.

2. The station of claim 1, wherein the beamforming report further comprises a plurality of beamforming feedback matrices, and each of the plurality of beamforming feedback matrices is associated with a respective tone of the bandwidth to be reported by the beamforming report.

3. The station of claim 2, wherein:
   a first field of the beamforming report comprises one of the plurality of SNR values associated with a subband, the subband comprising a plurality of tones;
   a second field of the beamforming report comprises one or more of the plurality of beamforming feedback matrices associated with the plurality of tones; and
   the first field is immediately adjacent to the second field.

4. The station of claim 1, wherein the bandwidth to be reported by the beamforming report is smaller than the channel bandwidth of the second frame.

5. The station of claim 1, wherein the plurality of average SNR values comprises a first set of average SNR values, wherein each of the first set of average SNR values is associated with a first space-time stream and one of a plurality of subbands of the bandwidth to be reported by the beamforming report.

6. The station of claim 5, wherein the plurality of average SNR values further comprises a second set of average SNR values, wherein each of the second set of average SNR values is associated with a second space-time stream and one of the plurality of subbands of the bandwidth to be reported by the beamforming report.

7. The station of claim 1, wherein one of the plurality of average SNR values is an SNR at the station for a space-time stream averaged over data subcarriers in one of a plurality of subbands of the bandwidth to be reported by the beamforming report.

8. The station of claim 1, wherein the first frame comprises a null data packet announcement frame, the second frame comprises a null data packet frame, and the third frame comprises a beamforming feedback frame.

9. The station of claim 8, wherein the one or more processors are configured to cause generating the beamforming report based on a station information field of the null data packet announcement frame.

10. The station of claim 9, wherein the station information field comprises an indication of a plurality of subbands of the bandwidth to be reported by the beamforming report, wherein each of the plurality of average SNR values is associated with one subband of the plurality of subbands.

11. The station of claim 1, wherein the one or more processors are further configured to cause:
   prior to providing the third frame for transmission, receiving a fourth frame for facilitating an uplink multi-user transmission,
   wherein the providing the third frame for transmission comprises, in response to receiving the fourth frame, transmitting the third frame at a predetermined time after receiving the fourth frame to allow simultaneous transmission of the third frame with one or more frames from one or more stations as part of the uplink multi-user transmission, and
   wherein each of the one or more frames comprises a beamforming report for a respective one of the one or more stations.

12. An access point for facilitating communication in a wireless network for multi-user transmission, the access point comprising:
   one or more memories; and
   one or more processors coupled to the one or more memories, the one or more processors configured to cause:
      transmitting a first frame to one or more stations, wherein the first frame indicates whether a first type of feedback or a second type of feedback is requested;

transmitting a second frame to the one or more stations;
receiving a third frame from a first station of the one or more stations, wherein the third frame comprises a beamforming report that includes a first plurality of average signal-to-noise ratio (SNR) values for the first and second types of feedback, wherein each of the first plurality of average SNR values is associated with a respective subband of a bandwidth, wherein a size of each respective subband is 26 tones, and wherein the 26 tones correspond to 26 tones in a smallest resource unit of a numerology of orthogonal frequency division multiple access (OFDMA) transmission associated with a channel bandwidth of the second frame, and wherein the beamforming report includes a delta SNR value for each reported subcarrier of the respective subband of the bandwidth when the first frame indicates that the second type of feedback is requested, the delta SNR value indicating a deviation of an SNR value of a reported subcarrier relative to an average SNR value averaged over subcarriers for a subband of the bandwidth; and
generating a beamforming matrix based at least on the third frame,
wherein the first frame comprises station-specific information associated with an allocation of subbands of the bandwidth.

13. The access point of claim 12, wherein the third frame further comprises a first plurality of beamforming feedback matrices, and each of the first plurality of beamforming feedback matrices is associated with a respective tone of the bandwidth to be reported by the third frame.

14. The access point of claim 12, wherein the one or more processors are configured to cause:
receiving a fourth frame from a second station, wherein the fourth frame comprises a second plurality of average SNR values, each of the second plurality of average SNR values is associated with a respective subband of a second bandwidth, and the bandwidth and the second bandwidth are the same or different.

15. The access point of claim 14, wherein the one or more processors are configured to cause:
generating the beamforming matrix based at least on the third frame and the fourth frame;
generating a beamformed data packet based on the beamforming matrix; and
transmitting the beamformed data packet to the one or more stations.

16. The access point of claim 14, wherein:
the first frame comprises one or more stations' information field;
each of the one or more stations' information field comprises a respective subband information and is associated with a respective station of the one or more stations; and
each of the third frame and the fourth frame is associated with the respective subband information.

17. The access point of claim 16, wherein the respective subband information of the respective station comprises a respective plurality of subbands, and wherein a plurality of average SNR values associated with the respective station is associated with one subband of the respective plurality of subbands.

18. The access point of claim 12, wherein the bandwidth is smaller than the channel bandwidth of the second frame.

19. The access point of claim 12, wherein the one or more processors are further configured to cause:
prior to receiving the third frame, transmitting a fourth frame for facilitating an uplink multi-user transmission; and
simultaneously receiving, at a predetermined time after transmitting the fourth frame, the third frame from the first station and a fifth frame from a second station of the one or more stations, the third and fifth frames being based on the fourth frame, wherein the fifth frame comprises a beamforming report for the second station.

20. A computer-implemented method of facilitating communication in a wireless network for multi-user transmission, the method comprising:
receiving a first frame, wherein the first frame indicates whether a first type of feedback or a second type of feedback is requested;
receiving a second frame subsequent to receiving the first frame, the second frame is associated with the first frame;
generating a beamforming report, wherein the beamforming report comprises one or more of average signal-to-noise ratio (SNR) values for the first and second types of feedback, wherein each of the one or more of the average SNR values is associated with a respective subband of a bandwidth, wherein a size of each respective subband is 26 tones, wherein the 26 tones correspond to 26 tones in a smallest resource unit of a numerology of orthogonal frequency division multiple access (OFDMA) transmission associated with a channel bandwidth of the second frame, and wherein the beamforming report includes a delta SNR value for each reported subcarrier of the respective subband of the bandwidth when the first frame indicates that the second type of feedback is requested, the delta SNR value indicating a deviation of an SNR value of a reported subcarrier relative to an average SNR value averaged over subcarriers for a subband of the bandwidth; and
transmitting a third frame comprising the beamforming report,
wherein the first frame comprises station-specific information associated with an allocation of subbands of the bandwidth.

* * * * *